United States Patent
Alon et al.

(10) Patent No.: US 12,430,077 B2
(45) Date of Patent: Sep. 30, 2025

(54) MULTIPLE COMMAND FORMAT INTERPRETATION FOR SSD

(71) Applicant: Sandisk Technologies, Inc., Milpitas, CA (US)

(72) Inventors: Amit Alon, Mishmeret Village (IL); Moshe Karni, Rehovoth (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/377,821

(22) Filed: Oct. 8, 2023

(65) Prior Publication Data

US 2025/0117160 A1 Apr. 10, 2025

(51) Int. Cl.
*G06F 3/06* (2006.01)
(52) U.S. Cl.
CPC .......... *G06F 3/0659* (2013.01); *G06F 3/0658* (2013.01); *G06F 3/0604* (2013.01); *G06F 3/0679* (2013.01)
(58) Field of Classification Search
CPC .... G06F 3/0659; G06F 3/0658; G06F 3/0604; G06F 3/0679
See application file for complete search history.

(56) References Cited

U.S. PATENT DOCUMENTS

| 7,957,173 | B2 | 6/2011 | Kim |
| 9,524,799 | B2 | 12/2016 | Desireddi et al. |
| 10,014,056 | B1 | 7/2018 | Lee et al. |
| 10,445,229 | B1* | 10/2019 | Kuzmin ................. G06F 12/10 |
| 10,528,255 | B2 | 1/2020 | Lee et al. |
| 2003/0212879 | A1* | 11/2003 | Henkel ............... G06F 9/30156 |
| | | | 712/E9.037 |
| 2005/0207232 | A1 | 9/2005 | Delfs et al. |
| 2015/0089119 | A1* | 3/2015 | Conklin ............. G06F 12/0246 |
| | | | 711/103 |
| 2017/0060422 | A1* | 3/2017 | Sharifie ................. G06F 3/0659 |
| 2022/0066958 | A1 | 3/2022 | Bhatia et al. |

\* cited by examiner

*Primary Examiner* — Jason W Blust
(74) *Attorney, Agent, or Firm* — Patterson + Sheridan, LLP

(57) ABSTRACT

In addition to transmitting over the ASIC-NAND bus the legacy long command format, a data storage device will be able to use also a compressed/improved command format. The alternate command's format is hidden from most parts of the NAND. The NAND can have a layer that will translate compressed/non standard commands to the legacy (standard) format for use by the rest of the NAND device's logic, as currently implemented. According to selected command format, the Low Level Flow Sequencer (LLFS) sequence generator and the flash interface module (FIM) will know which format to use in order to encode the command's content for transmission to the NAND by the FIM/ASIC/controller. The command is then executed on the NAND side according to the selected command scheme. Changes will be applied in the device controller on the ASIC side—to encode the command, and on the NAND side—to decode the command according to the selected format. The controller on the ASIC side decides on the desired format and is responsible to sync any format change with the NAND before sending a command in a different format than currently agreed between the controller and the NAND.

26 Claims, 26 Drawing Sheets

600 → 01, 80/85, addr(A0, P0), data(0, P0), 11, 01, 80/85, addr(A0, P1), data(0, P1), 1A → ADL
02, 80/85, addr(A0, P0), data(1, P0), 11, 02, 80/85, addr(A0, P1), data(1, P1), 1A → BDL
03, 80/85, addr(A0, P0), data(2, P0), 11, 03, 80/85, addr(A0, P1), data(2, P1), 15 → CDL + StartProg

FIG. 6A

610 → <TLC_WRITE_OPCODE_START, addr(A0)>, <<data(LP P0+P1 data + Parity, MP P0+P1 data + Parity, UP P0+P1 data + Parity)>>, <Command End 15> → StartProg

FIG. 6B

620 → 01, 80/85, addr(A0, P0), data(0, P0), 11, 01, 80/85, addr(A0, P1), data(0, P1), 1A → ADL
02, 80/85, addr(A0, P0), data(1, P0), 11, 02, 80/85, addr(A0, P1), data(1, P1), 1A → BDL
03, 80/85, addr(A0, P0), data(2, P0), 11, 03, 80/85, addr(A0, P1), data(2, P1), 10 → CDL + StartProg

FIG. 6C

630 → <TLC_WRITE_OPCODE_START, addr(A0)>, <<data(LP P0+P1 data + Parity, MP P0+P1 data + Parity, UP P0+P1 data + Parity)>>, <Command End 10> → StartProg

FIG. 6D

Table 14: SLC Addressing Definitions

| Cycle | I/O7 | I/O6 | I/O5 | I/O4 | I/O3 | I/O2 | I/O1 | I/O0 |
|---|---|---|---|---|---|---|---|---|
| First Cycle | CA7[1] | CA6 | CA5 | CA4 | CA3 | CA2 | CA1 | CA0 |
| Second Cycle | X[1] | CA14 | CA13 | CA12 | CA11 | CA10 | CA9 | CA8 |
| Third Cycle | PA7[1] | PA6 | PA5 | PA4 | PA3 | PA2 | PA1 | PA0 |
| Fourth Cycle | PA15 | PA14 | PA13 | PA12 | PA11 | PA10[2] | PA9 | PA8[3] |
| Fifth Cycle | PA23[4] | PA22 | PA21 | PA20 | PA19 | PA18 | PA17 | PA16 |

Table 14: SLC Addressing Definitions

| Cycle | I/O7 | I/O6 | I/O5 | I/O4 | I/O3 | I/O2 | I/O1 | I/O0 |
|---|---|---|---|---|---|---|---|---|
| First Cycle | CA7[1] | CA6 | CA5 | CA4 | CA3 | CA2 | CA1 | CA0 |
| Second Cycle | X[1] | CA14 | CA13 | CA12 | CA11 | CA10 | CA9 | CA8 |
| Third Cycle | PA7[1] | PA6 | PA5 | PA4 | PA3 | PA2 | PA1 | PA0 |
| Fourth Cycle | PA15 | PA14 | PA13 | PA12 | PA11 | PA10[2] | PA9 | PA8[3] |
| Fifth Cycle | PA23[4] | PA22 | PA21 | PA20 | PA19 | PA18 | PA17 | PA16 |

MULTIPLE COMMAND FORMAT INTERPRETATION FOR SSD

BACKGROUND OF THE DISCLOSURE

Field of the Disclosure

Embodiments of the present disclosure generally relate to a mechanism that supports multiple commands formats, to enable on-the-fly commands format changes—that can introduce device performance, reliability and efficiency improvements.

Description of the Related Art

Memory device controllers interacts with multiple NAND interfaces using an application specific integrated circuits (ASIC)-NAND bus. The ASIC-NAND bus protocol, along with the command layer, is defined by the Joint Electron Device Engineering Council (JEDEC) standard. The JEDEC standard defines the low level sequences and commands that are driven by the device controller from the ASIC side to achieve a specific low-level operation on the NAND side. These commands run over the ASIC-NAND bus.

Information running on the bus used to carry memory device (e.g., NAND) operations (i.e., instructions) is split into two types: command and data. The command and data are sent interleaved, and a combination of one or more sets of command and data can be used to represent a single operation request from the NAND, like program, read, etc. The command part of the instructions is transmitted over the ASIC-NAND bus using conventional mode at low data rate (e.g. 50/100 MHz), while the data that is sent over the bus using TM (Toggle Mode) is at much higher data rates (e.g. 2000/3600-4800 MHz).

Due to the ratio between the command transmission rate and the data transmission rate, the command section must be very optimized and efficient. Unnecessarily long commands transmitted over the bus using conventional mode at slow data rate has significantly higher negative affect compared to transmitting extra data bytes using TM at high data rate. The inefficiency is multiplied by the ratio of the slow data rate vs. the fast data rate, making every inefficiency in the command transmission to have large effect of unnecessarily occupying the channel for relatively long time. In addition, switching between the conventional mode and toggle-mode takes time, and contributes to the inefficiency and the complexity of managing the NAND bus interface.

Therefore, there is a need in the art for improving data transmission over the ASIC-NAND bus.

SUMMARY OF THE DISCLOSURE

In addition to transmitting over the ASIC-NAND bus the legacy long command format, a data storage device will be able to use also a compressed/improved command format. The alternate command's format is hidden from most parts of the NAND. The NAND can have a layer that will translate compressed/non standard commands to the legacy (standard) format for use by the rest of the NAND device's logic, as currently implemented. According to selected command format, the Low Level Flow Sequencer (LLFS) sequence generator and the flash interface module (FIM) will know which format to use in order to encode the command's content for transmission to the NAND by the FIM/ASIC/ controller. The command is then executed on the NAND side according to the selected command scheme. Changes will be applied in the device controller on the ASIC side—to encode the command, and on the NAND side—to decode the command according to the selected format. The controller on the ASIC side decides on the desired format and is responsible to sync any format change with the NAND before sending a command in a different format than currently agreed between the controller and the NAND.

In one embodiment, a data storage device comprises: a memory device; and a controller coupled to the memory device, wherein the controller is configured to: detect that a command received from the controller is a compressed command; decompress the compressed command; and execute the decompressed command.

In another embodiment, a data storage device comprises: a memory device; and a controller coupled to the memory device, wherein the controller is configured to: detect that a command received from the controller is a compressed command; retrieve information for the compressed command from a location in the memory device; and execute the compressed command based upon the retrieved information.

In another embodiment, a data storage device comprises: means to store data, wherein the means to store data is configured to: detect whether a received command is a compressed command or a non-compressed command; and execute the detected command; and a controller coupled to the means to store data, wherein the controller is configured to: send compressed commands and non-compressed commands to the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A is a diagram illustrating an old TLC command for cached operations, according to certain embodiments.

FIG. 6B is a diagram illustrating a new TLC command for cached operations, according to certain embodiments.

FIG. 6C is a diagram illustrating an old TLC command for non-cached operations, according to certain embodiments.

FIG. 6D is a diagram illustrating a new TLC command for non-cached operations, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
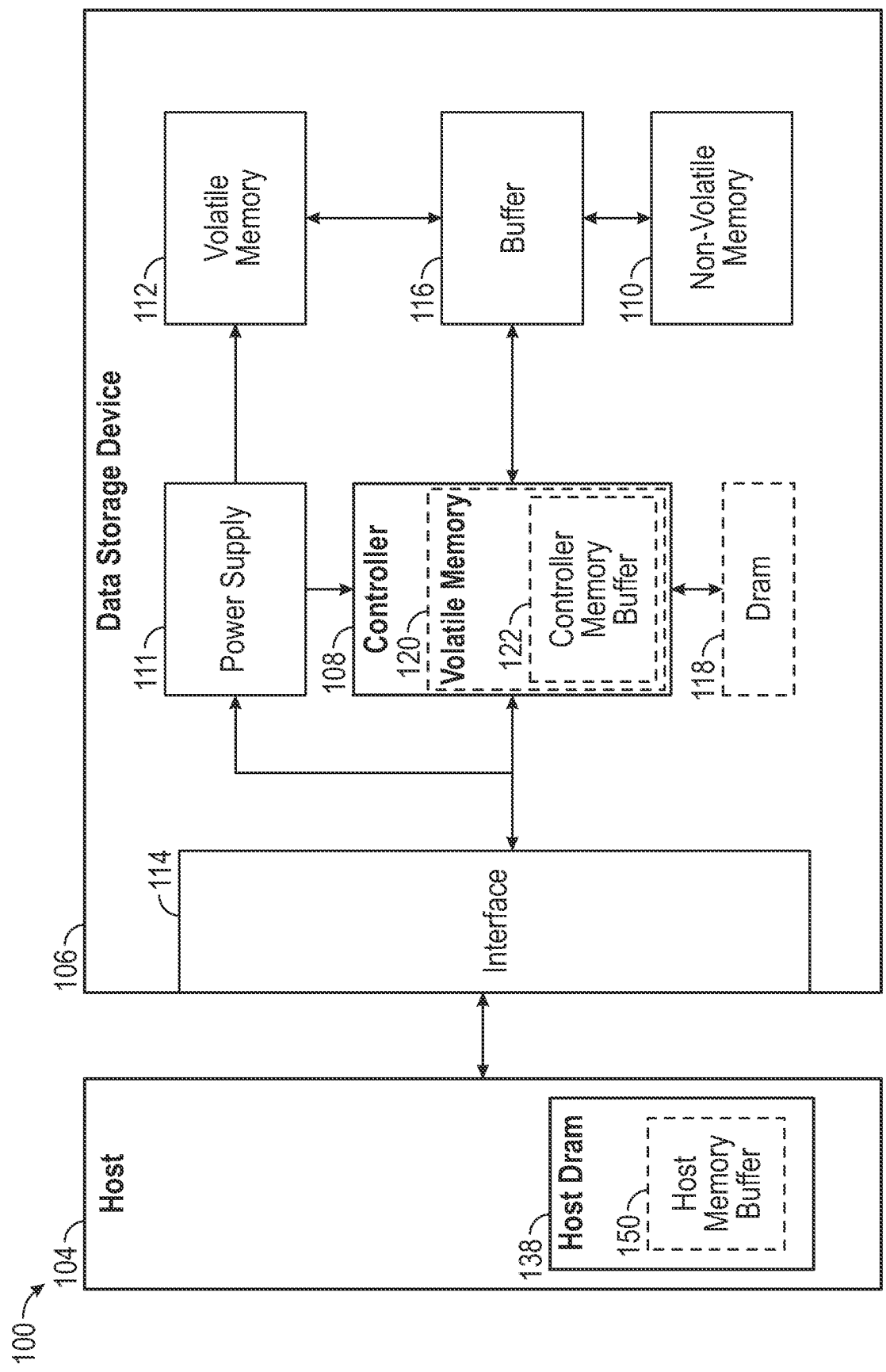
FIG. 1 is a schematic block diagram illustrating a storage system in which a data storage device may function as a storage device for a host device, according to certain embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In addition to transmitting over the ASIC-NAND bus the legacy long command format, a data storage device will be able to use also a compressed/improved command format. The alternate command's format is hidden from most parts of the NAND. The NAND can have a layer that will translate compressed/non standard commands to the legacy (standard) format for use by the rest of the NAND device's logic, as currently implemented. According to selected command format, the Low Level Flow Sequencer (LLFS) sequence generator and the flash interface module (FIM) will know which format to use in order to encode the command's content for transmission to the NAND by the FIM/ASIC/controller. The command is then executed on the NAND side according to the selected command scheme. Changes will be applied in the device controller on the ASIC side—to encode the command, and on the NAND side—to decode the command according to the selected format. The controller on the ASIC side decides on the desired format and is responsible to sync any format change with the NAND before sending a command in a different format than currently agreed between the controller and the NAND.

The switch between legacy inefficient format and compressed format can be done using a preceding command or using other ways of mode change markup (HW signaling, etc). The LLFS+FIM or any other entity in the ASIC encodes the command to be transmitted to the NAND are on the sending side—the ASIC controller. They encode the command according to the selected scheme, while the receiving side, in the NAND dies should decode the received instructions according to the selected scheme. The sending side is deciding about changing the working mode from legacy (which is not efficient) to compressed/alternate/improved format. If the controller want to switch to compressed/alternate/improved format or to any format that is not currently synched with the NAND side, it should inform about it to the NAND, and have the LLFS build commands using the compressed/alternate format and send them to the NAND using the FIM. Note that the LLFS+FIM are only modules that encode the command according to one embodiment. Other modules on the ASIC side may be used to encode the commands that will be transmitted to the NAND.

At the NAND side a receiving logic will be added. This logic will decompress the received command, and the decompressed command, that will look exactly as the legacy format will be transferred to the rest of the NAND logic for handling. The command's transmission encoding mechanism (e.g. LLFS+FIM) on the controller/ASIC side will know which format to use in order to encode according to the chosen command format the command's content for transmission to the NAND by the FIM. So when changing working mode, the controller side (ASIC–LLFS+FIM) will have to build the compressed/alternate/legacy format and the receiving side (NAND) will have to decompress (reformat) the received command if compressed/alternate format mode is selected, or use the command as was received, according to the mode, and then handle the received/decompressed command as it does now.

After decompression/reformatting, if it was needed the command's handling by the NAND is done using the same way it is done without the suggested change. Changing to work in compressed format affects both the controller side—that should build the commands in legacy/compressed/alternate format, and on the receiving side (that should decompress/reformat the command if needed, and then handle it). The controller should sync the NAND on any format change. Also this mode change should not be limited to compression only—it was suggested that when a mode change signaling will be done, the format change will be able to introduce also other flexibilities that are not about compression only, and to support cross-commands data compression.

Depending on the implementation of SSD device, NAND instructions can be altered to include improved, less general and more use-case-specific format, that allows sending reduced command's length, or to introduce new capabilities.

This requires change in the ASIC side that encodes the instructions transmitted over the ASIC-NAND bus, and on the NAND that decodes the received instructions, and informing the NAND on any format change done by the controller in the ASIC side.

The NAND dies of SSD device are manufactured and shared with other vendors of SSD devices and must support the standard legacy commands format. This invention offers a way to support both legacy format, compressed commands format, and an alternate improved NAND's instructions format.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level, and partial page level, and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
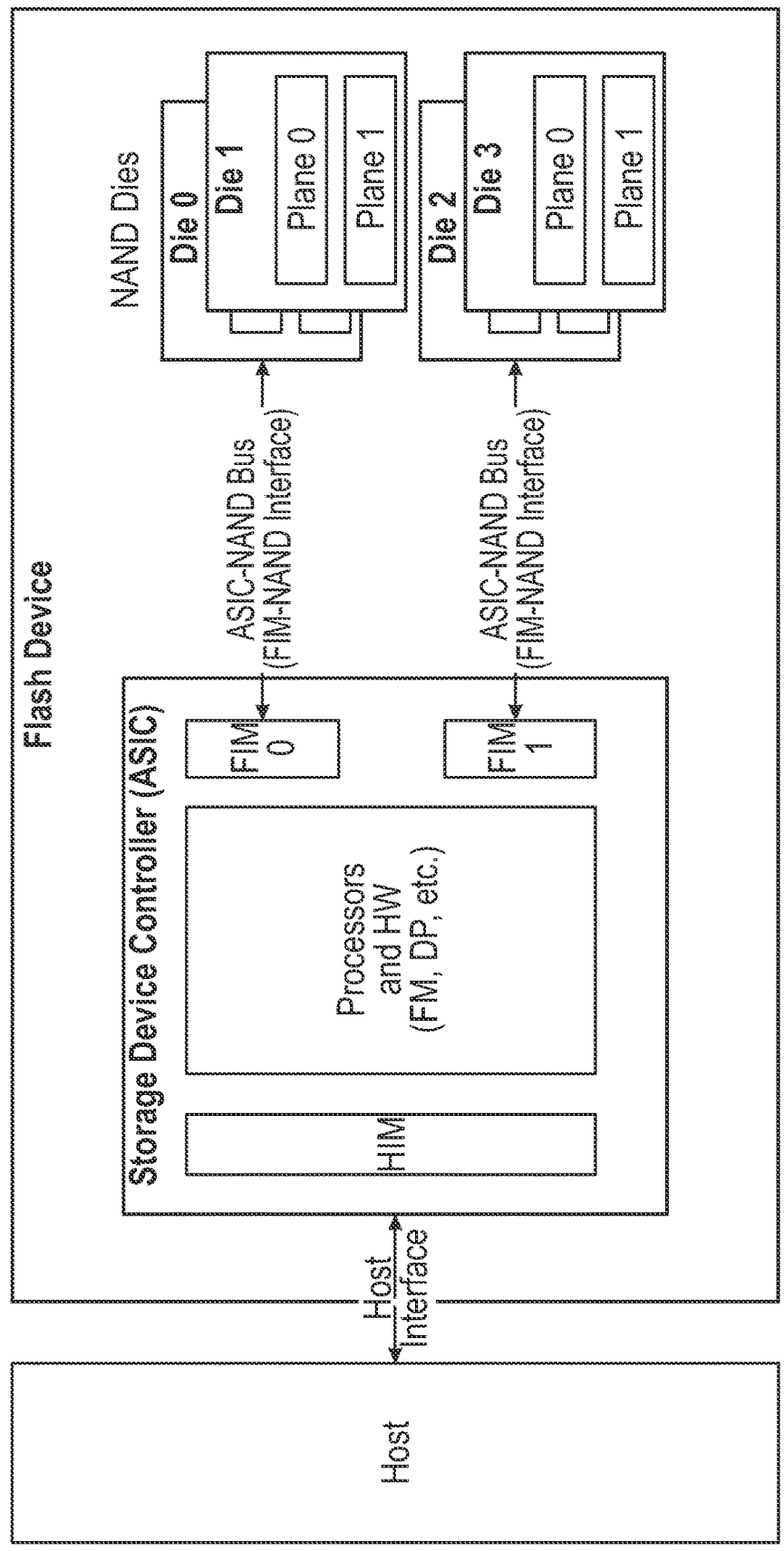
FIG. 2 is a block diagram illustrating a system for commands running over the ASIC-NAND bus, according to one embodiment.

FIG. 2 is a block diagram illustrating a system 200 for commands running over the ASIC-NAND bus, according to one embodiment. The memory device controller interacts with multiple NAND interfaces using the ASIC-NAND bus. The ASIC-NAND bus protocol along with the command layer is defined by the JEDEC standard. The standard defines the low level sequences and commands that are driven by the device controller from the ASIC side to achieve a specific low level operation on the NAND side.

Information running on the ASIC-NAND bus is split into two parts. The instructions, which includes the commands, address (command part); and data. The two parts are sent interleaved, and a combination of the two parts can be used to represent a single operation request from the NAND (program, read, etc.). The command part is transmitted over the ASIC-NAND bus using a conventional mode at low data rate (e.g. 50/100 MHz), while the data is sent over the AISC-NAND bus using toggle mode (TM) at much higher data rates (e.g. 2000/3600-4800 MHz). It should be noted that one instruction can be made by more than one set of command parts and/or data parts.

Due to the ratio between the command rate and the data rate, the command section should be optimized and efficient. Unnecessarily long command bytes transmitted over the ASIC-NAND bus using the conventional mode at a slow data rate have significantly higher negative effect compared to transmitting extra data bytes using TM at a high data rate. The inefficiency of sending unnecessary bytes in the command part is multiplied by the ratio of the slow data rate versus the fast data rate, making every inefficiency in the command transmission to have large effect of unnecessarily occupying the channel for a relatively long time.

On the flash device there are two parts, the storage device controller (ASIC) and the NAND dies. The communication from the ASIC to the NAND is running on the flash interface module (FIM) and the ASIC-NAND bus. The communication running on the AISC-NAND bus is using a JEDEC format. In many cases, the NAND will probably have to support this format. The JEDEC standard should be supported and may be used in cases that the flexibility that can be archived using the longer, legacy format will be needed, or in order to have a backup option in case of some bugs in the HW (i.e., rolling back to what worked can also be good).

Looking at this communication and the commands running on the ASIC-NAND bus, there is some inefficiency represented. Commands running on a legacy mode are sent using a slow data transmission rate. When the information that is on the command side is unnecessarily too long, the information can be squeezed into smaller commands for efficiency. Having the smaller commands will generate faster communication.

Figure 3:
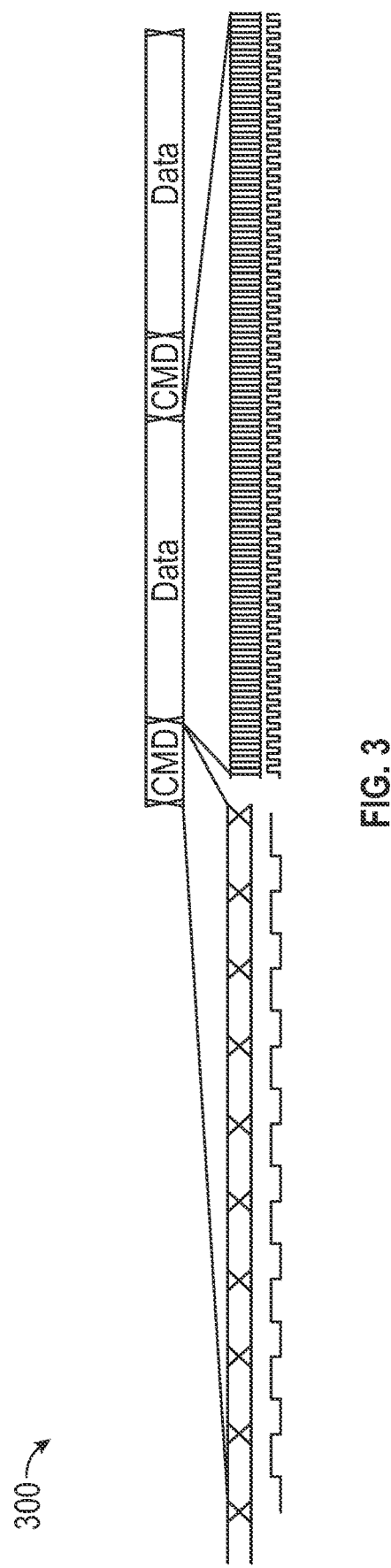
FIG. 3 is a diagram illustrating a command and data transfers on an ASIC-NAND bus, according to one embodiment.

FIG. 3 is a diagram illustrating command and data transfers on an ASIC-NAND bus 300, according to one embodiment. It is to be understood that FIG. 3 is merely a conceptual illustration and not to be limiting of the disclosure. In actuality, the command part, including the opcode, address, and command end marking that triggers the execution, and data are sent interleaved, and several repetitions of these can combine a single NAND operation request. The bus can change the transmission rate and mode from legacy to TM and back several times for one NAND operation and the command part can also be changed with the address. For most of the performance use cases that run on flash devices, the commands that run on the NAND bus 300 contain unnecessary data. The extra unnecessary data, along with the TM to conventional mode changes back and forth cause inefficiency in the way that the channel is used. The changes back and forth consumes time and requires management, and unnecessary toggling the bus lines consumes power, thus reduces the overall performance of the flash device. Slower commands transmission takes longer time to execute. When the device is under stressed situation of unstable power/power droops, finishing handling the commands in the pipe will improve the device reliability and decrease the chance of losing critical management data that in some cases can end up with a failing device.

The standard JEDEC command inefficiency comes in the form of sending many fields that can be omitted or that allows flexibility which is not needed for many common use cases. The fields are split to several domains such as: duplicated data fields, un-necessary command field separators, and fields that can be better encoded (e.g. inefficient address representation). The command part is sent, and the data is sent. The data rate is much faster. The data rate is determined by the bus mode that sets the way that the data is transferred and sampled: using legacy mode or TM (Toggle Mode).

Figure 4:
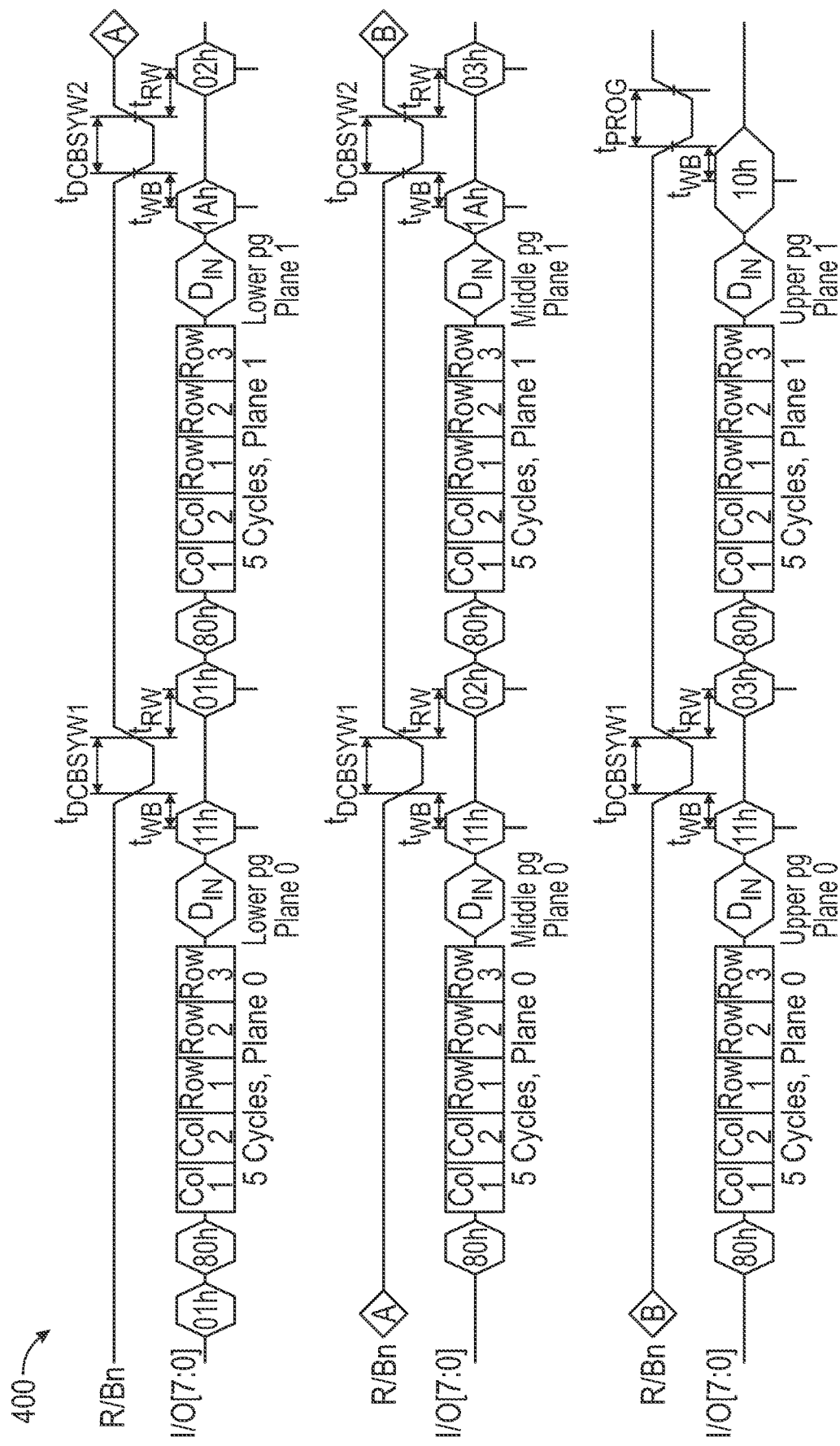
FIG. 4 is a diagram illustrating a multi (dual) plane TLC write, according to one embodiment.

FIG. 4 is a diagram illustrating a multi (dual) plane TLC write 400, according to one embodiment. The multi (dual) plane TLC write 400 comprises a lower page, a middle page, and an upper page. Each of the pages comprises two planes for this example, but could be less or more. The current setup for the TLC write 400 is considered the standard of TLC writes.

Figure 5A:
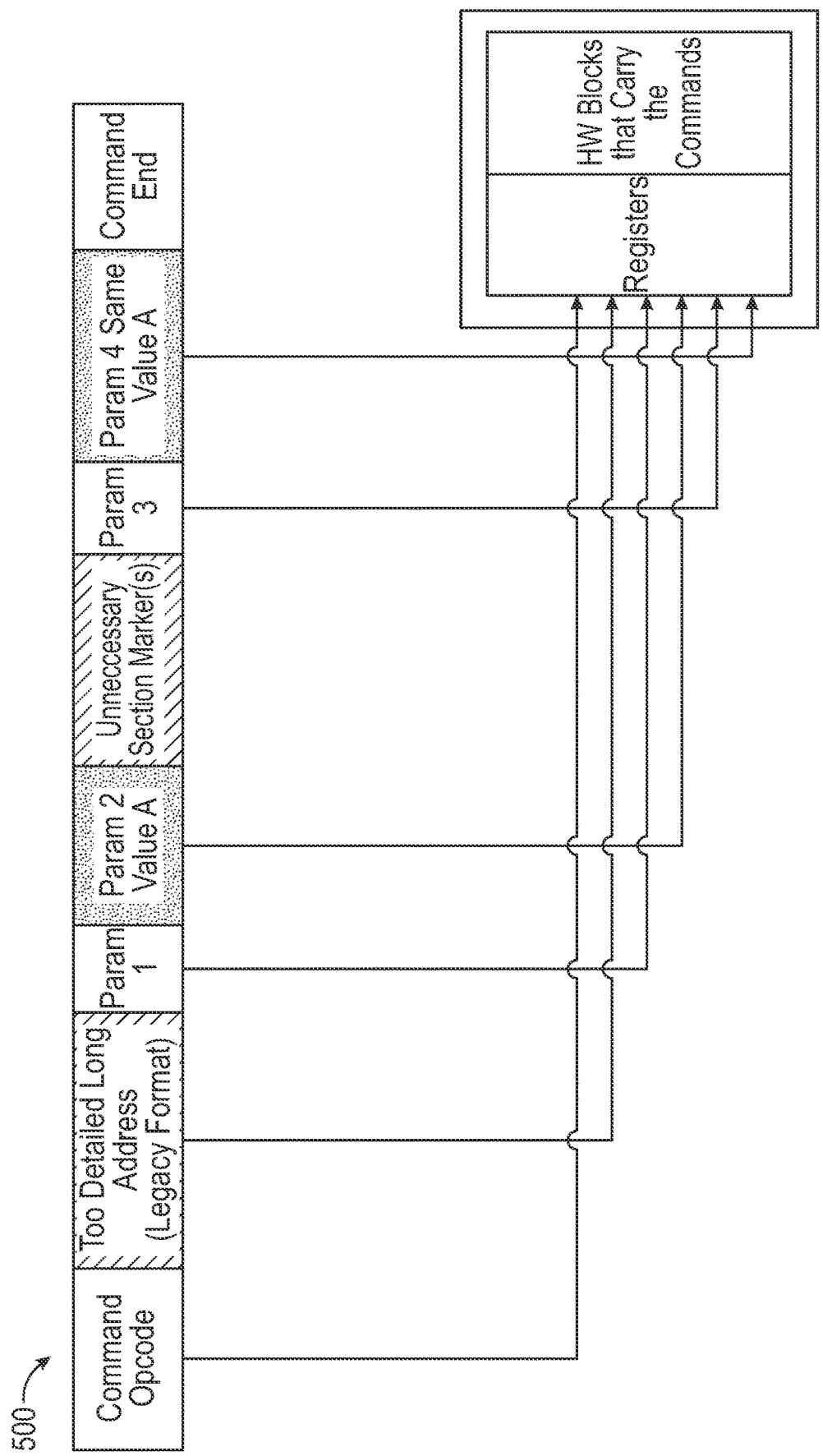
FIG. 5A is a block diagram illustrating a system for a current command format, according to certain embodiments.

FIG. 5A is a block diagram conceptually illustrating a system 500 for the current command format, according to certain embodiments. Data (transmitted at toggle mode) may be interleaved between the different sections of the command, but is omitted from this figure. In some embodiments, the NAND collects the current command's bytes in a shift register and interprets the received command according to the command opcode defined by the standard, which defines the format and meaning of each field of the command. The command opcode determines the structure of the command part, which are the operands of the commands, and interleaved data may, in some embodiments, be determined by the command format and/or according to control signals of the bus (e.g., ALE, CLE, etc). Other implementations can be to collect the operands of the commands and pass them on the fly to other parts of the NAND's logic. This is done so the command knows exactly where the operands is being transmitted and the operand's meaning. Then, the operands are extracted and sent to the relevant locations that use this data.

The commands are transferred from the controller on the ASIC side to the NAND side. In the system 500, the command opcode, a too detail long address in legacy format, parameter 1, parameter 2 with value A, an unnecessary section marker, parameter 3, and parameter 4 with the same value A (or similar) are typically sent to NAND's registers. The registers are connected to the hardware (HW) blocks that carry the commands. An example of parameter 2 and 4 can be the address which in many cases can be the same for most common use cases. This duplication of the same address transmission may repeat itself within a single command more than once.

In another embodiment, a state machine or some other logic is collecting command parameters (e.g., parameter 1, 2, 3, 4 etc.) and passing them into the relevant locations in the NAND design. The command opcode is triggering the operation and the information in between the command opcode and the command end is the operands or the parameters that, in some cases, are too detailed to allow flexibility that is not needed for the common use cases, and the data. Not all the information between the opcode and the command end need to be transmitted for most of use cases. In flash devices, such as the flash device of FIG. 2, some of the information between the command opcode and the command end can be either shrink, sent only once instead of several times, or can be omitted while keeping the functionality of the command, if the command format will be redefined.

Figure 5B:
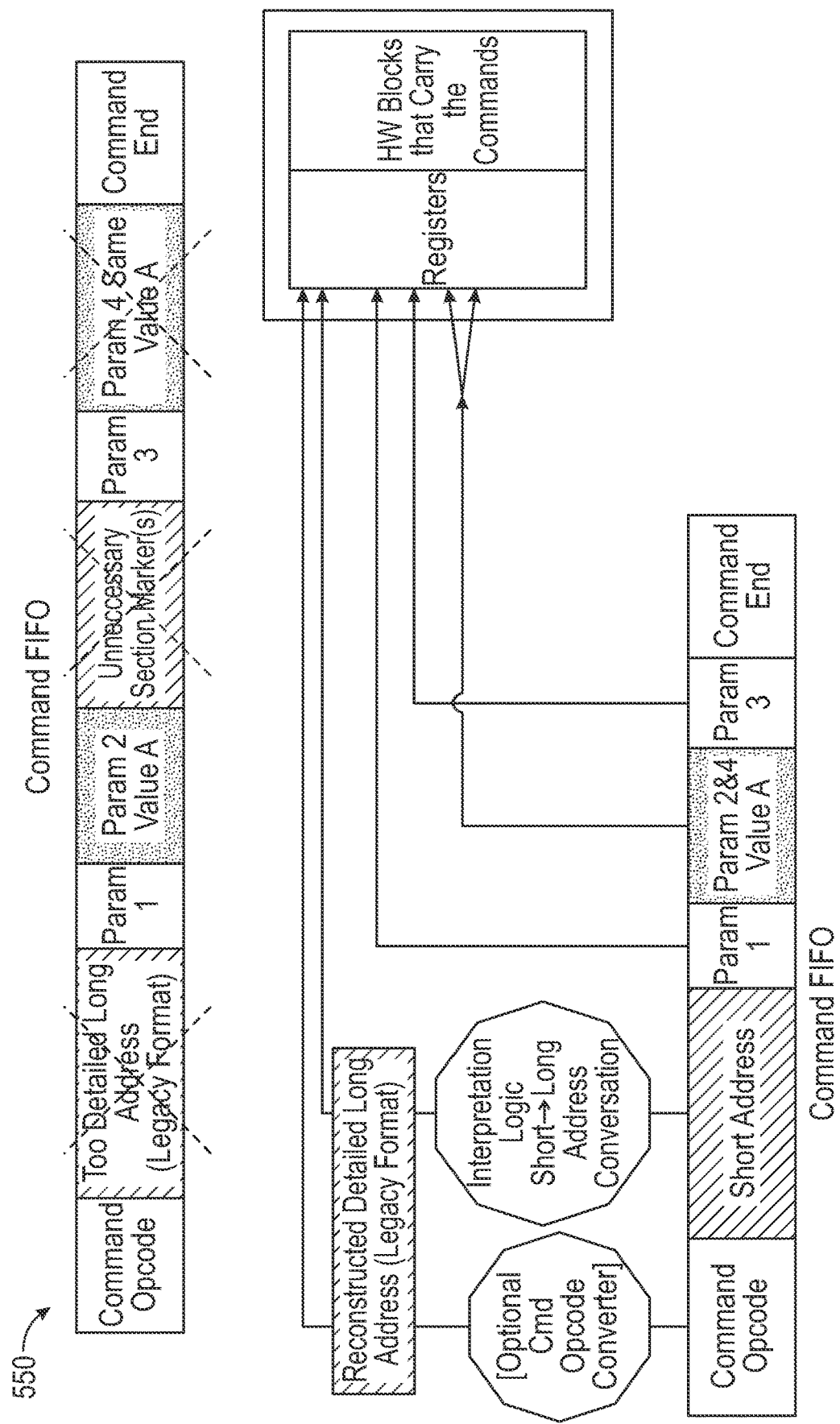
FIG. 5B is a block diagram illustrating a system for a new command format, according to certain embodiments.

FIG. 5B is a block diagram illustrating a system 550 for a new command format, according to certain embodiments. Duplicated command data can be eliminated in the compressed command. The too long detailed addresses, the extra parameters, repeated values, values that can be extracted due to values that were already transmitted, and the unnecessary section markers can be eliminated in the new command format. Other information can be eliminated as well.

Instead of a long address, short address can be sent with some added slim and simple "glue-logic" that will translate the short address back to the long, detailed format. The purpose of adding this glue logic that will reconstruct the original format and reflect the original format to the rest of the NAND is to add the minimum modifications and keep the NAND as is, almost without "knowing" that the eliminated information was not sent. The "glue-logic" can be either that of firmware (FW) or hardware (HW). An opcode command converter in some cases is implemented to use other (may be unused) command opcode for the compressed/modified alternative of the original opcode. Using the opcode converter is optional so that another opcode will be translated to the end to be reflected as the old original opcode of the previous longer command.

In the compressed command, the opcode will be written again. The long address will be converted to a short address and the parameter 2 with value A and parameter 4 with value A will be sent only once and extracted from the same location to both directions. Parameter 1 and parameter 3 will also be sent with the compressed command. Fields that can be implied from other sources are removed or reformatted to consume less data but the same functionality can still be achieved. Most parts of the NAND will get the data without knowing that some of it was reconstructed by the "glue logic", and that it was not sent over the ASIC-NAND bus. The solution of the transmitted data is the compressed command, which is "hidden" from the majority of the existing NAND logic allows to keep most of the NAND logic as implemented without any change.

In another embodiment, the new command or compressed command can introduce some new flexibilities to the existing commands that will allow a more efficient use that was not possible in the legacy command. For example, when not using asynchronous plane operation (APO), there is no need to send the address more than once, since the typical use case will have the same address for all planes. A bit in the command (or a different command, or some NAND set-feature setting, or some other way to mark this) can tell if to expect another address field or if the sent address referrers to all planes.

In another embodiment, the new shorter command will cause the command to be more limited. However, during the common use of said command, the command is used in a basic way. Since the shorter command is used in a basic way, there is no need to spend "bus time" on sending parameters that are not used or have the same values as parameters that were already sent. The longer command can be sent in the case if extra data is really needed.

FIG. 6A is a diagram illustrating TLC cached write command for a device with 2 planes, according to certain embodiments. The cached operation 600 is done by the controller transmitting a command to the NAND with an address and with data and more parameters that defines the format of the command. In FIG. 6A, within the first written line, (the clock rate is changing. The data on line 01 is changing from one location to another location, but some of the parts of line 01 are not changing. In FIG. 6A, there are three written lines. The first line starts with 01 and refers to the lower page, plane 0 followed by the lower page, plane 1. The second line that starts with 02 refers to the middle page, plane 0 followed by the middle page plane 1. The third line starts with 03 and refers to the upper page, plane 0 followed by the upper page, plane 1. P0 stands for plane 0, and P1 stands for plane 1. LP stands for lower page, MP stands for middle page, and UP stands for upper page. A0 is the address that repeats itself all the time in the common use case for all planes and all pages.

There is a big waste of the data in this 2 planes TLC cached write operation 600. To have the data transmitted again and again of the information that can be eliminated is a waste. Here the transfer of the data to the lower page at planes 0,1, then transfer the data to the middle page at planes 0,1, and then transfer the data to the upper page at planes 0,1. Once the transfers are complete, then the TLC Write operations 600 can begin because all the data is available.

Taking a closer look at the parts that are transmitted, here on a TLC write command is handling all of the lower page, all of the middle page, and then all of the upper page. The standard gives flexibility to the cached operation 600. Since for most use cases, the 2 planes TLC write operations are always done at this order (lower page, plane 0, then lower page plane 1, then middle page plane 0, then middle page plane 1, then upper page plane 0, then upper page plane 1), the information about the page and plane is unnecessary and can be omitted from the command that is sent over the ASIC-NAND bus. It is to be understood that the aforementioned is merely an example for one embodiment, and that the number of pages or planes can be different and other use cases of elimination of known command parts can be applied differently.

For full page TLC write, for example, the information on the page to which the data is written can be known without actually sending the "page" information in the command, and the extra logic on the NAND side can be added in order to present to the rest of the NAND implementation as if all the information including the command's page parameters was transmitted. The information on the ASIC side can be eliminated to save 6 bytes, in this example, which are transmitted at slow data rate. The order of 2 plane TLC write, for example, in the typical use cases will always write in the following pages order: LP (plane0), LP (plane1), MP (plane0), MP (plane1), UP (plane0), UP (plane1). For most common use cases, the same address is being sent for plane 0 and plane 1 for all pages, so rather than sending the same address several times (6 in the case of 2 planes TLC write), it can be transmitted only once per command. Eliminating the duplicated information saves another 5*5 bytes=25 command bytes+2 address bytes of the full page write address shortening due to lower granularity by command compression. In some embodiments, the address will be 6 bytes length, so there are 5 more bytes saved from the duplication in address transmission which equal the total of 6*5=30 Bytes+2. The ending byte of the command can have different values to mark if the command is doing a cache operation or non-cache operation. In the case described in the TLC write example, this is a cached operation.

Command sections marker bytes (i.e., fields that are part of the command that mark sections of the command), as the bytes 80/85, 11, 1A, 15 in the example of dual plane TLC write as can be seen in FIG. 6A, that tells when the command part of each page/plane is starting and ending is also constant and in many cases can be omitted from the commands. There is no justification to send/resend these marker data bytes repeatedly when the number of FMUs to write/read are known, the length of the data to transfer is known as well so the command's markers that mark the end of data of one plane/page can be omitted. To avoid resending marker data, after an expected amount of data bytes are received, the next plane/page data can be transmitted without the referred markers. The format is known and the length of the information transmitted between the beginning and the end of the command is known or for partial page can be coded into few bits only, so the receiving side can know where the data of the lower page on plane zero is starting and ending, and so for other planes and pages. If a partial page is used, then the length of the data can be communicated using some length bits (granularity of number of FMUs being programmed/read), or using other mechanism. The partial page/full page information will be sent once and be represented using less data. Other way can also be used to transmit the length information that will allow elimination or reduction in the command's section markers transmission. The length also can also be encoded using a few bits that will say how many FMUs are being accessed. The length of the FMU and its validity signature (e.g. parity) is usually constant per system, and can be set at init time if the default values is not the same as used by the current system. Few bits can be pre-configured to the NAND to direct the command to the relevant FMU(s). In many systems FMU size is 4K, but extra flexibility can be added to support FMUs that have different size other than 4K. For example 2K, 1K, ½K or 8K. Also the data validation signature (e.g. parity) length can change, and this defines the length of the data that is sent for each page/plane.

Note that FMU offset relates to the address field (coded in the legacy command that will be compressed with the address compression. It is not related to the command's markers that are suggested to be removed. Also, other command markers that can be removed are the ones that define the page (i.e., UP/MP/LP) and plane (i.e., P0/P1). These can be removed since during normal operation, the same order is always used (i.e., LP P0, LP P1, MP P0, MP P1, UP P0, UP P1) so there is no need to mark it in the command when it can just be built in this order at the NAND's side known that the data is sent in the specific order when using the compressed command. Note that the length of the data is derived from the number of FMUs, the data length of each FMU (usually 4 KB but may be other lengths) and the length of the data validation signature (parity generated by the LDPC). The FMU and the parity length can be stored in a register, and the register can have a default value set at a system init/reset, and the only parameter needed is how many data units (i.e., FMUs) that are to be written/read from the device. Once this is known, the NAND can know when data of another page/plane is starting without the relevant markers in the command.

Continuing the above, another 12 bytes can be saved by eliminating transmission of the 12 bytes, or at least some of the 12 bytes. It is contemplated that the first and last bytes, or some other combination, could still be transmitted, and in so doing fewer bytes are transmitted. For example, keeping some information on the first line in order to tell which operation is to be executed and majority of the repeated information will be removed, which will cause 10 bytes saved. 11 bytes can be saved if the information on the last line is somehow encoded to the command's opcode or marked using a bit in another available location, if found, and that the end of the command can be removed. The total potential of 6+25 (30 @ in some implementation)+2+11=45 (49 at in some implementations when the address is described using 6 bytes) slow command bytes saving at TLC multi (dual) plane write (for writing 96 KB+ECC of data).

Starting BiCS6 onwards will usually perform four planes operations, instead of the two planes operations. This will double the savings in command bytes transmission. Devices that will run on a QLC technology will also have increased accumulated saving compared to the above TLC example due to having one more page represented in the commands that can benefit from the same improvements. Future enhancements similar to the above can increase the saving even further. Data rates ratio between toggle mode and conventional legacy mode affect the improvement. The expectation is that in future designs, the ratio between the legacy mode and the toggle mode rates will be even larger, and this will cause the improvement to be even more significant this will be a ratio that will cause the improvement to be more significant.

Also, the time and management saving that will occur due to the elimination in need to switch the bus mode from conventional to TM back and forth unnecessarily is significant. The time and management savings will be added to the improvement achieved due to the compression in the transmitted command size. The improvement will be reflected in two changes of the bus mode instead of 32, for the example of a four planes QLC write.

Absolute accumulation of this saving can add up to significant values. The motivation is to optimize the communication on NAND bus, in order to increase the efficiency and the performance using a propriety version of the commands, in parallel to supporting the legacy JEDEC format. Savings can be achieved by having efficient command sequences over the NAND bus and having minimum transitions between the legacy and TM bus modes.

FIG. 6B is a diagram illustrating a suggested for new format of TLC cached write command 610, according to certain embodiments. The new TLC cached write command is used to send the opcode and the address using a conventional mode, and then return to the toggle mode (the fast data transmission mode) and send the data of all the planes and all the pages. Once the data is finished, send just the command ending which can be sent or, according to the specific implementation, can also be skipped. The command ending will be skipped if the information about the length of data and command type cached/non cached will be recorded into the TLC-WRITE_OPCODE_START. The command part that is transmitted using conventional mode (slow data rate) is surrounded in single ">". The data part that is transmitted using TM (fast data rate) is surrounded in double ">>". Using this scheme, many slow command bytes sent over the bus using slow clock will be saved. The bus transmitting mode changes from conventional mode to TM, will be only two times, instead of 32, in the example of four planes QLC write (actually one time change from conventional mode to TM and back—when the commands are performed back to back).

FIG. 6C is a diagram illustrating an old TLC command for non-cached operations 620, according to certain embodiments. The non-cached operation 620 is transmitting a command with an address and with data. Line 01 is running on a fast clock while line 02 is running on a slow clock. The data on line 01 is changing from a one-time to another time, but some of the parts of line 01 are not changing. The D0, P0 of line 01 is data for the lower plane for page zero and D0, P1 is data for the lower plane for page one. The address for the lower plane for page zero and page one are the same. The difference of the address is when using plane zero or plane one.

There is a big waste of the data in this non-cached operations 620. To have the data transmitted again and again of the information that can be eliminated is a waste. Here the transfer of the data to the lower page, then transfer the data to the middle page, and then transfer the data to the upper page. Once the transfers are complete, then the non-cached operations 620 can begin because all the data is available.

Taking a closer look at the parts that are transmitted, a TLC write command is handling all of the lower page, all of the middle page, and then all of the upper page. This standard could give flexibility to the non-cached operation 620. Since the standard is what is done in practice, all of the information in line 01, line 02, and line 03 is unnecessary.

The information on each of the lines can be known from the fact the TLC write command, and the extra logic on the NAND side can be added in order to present to the rest of the NAND implementation as if all the information from each line was transmitted. The information on the one side can be eliminated to save at least 6 bytes on the slow data rate. The purpose of sending the page bytes is so all 6 page bytes can be removed after the plane is cleared, so that the operation that is executed is a TLC page write. The pages will be LP (plane0), LP (plane1), MP (plane0), MP (plane1), UP (plane0), UP (plane1). The same address is being sent for plane zero or plane one rather than sending the same address for the number of times the address shows up on each line. Therefore, since the same address shows up multiple times in each line the address is interchangeable. Eliminating the duplicated information saves another 5*5 bytes=25 command bytes+2 address bytes of the full page write address shortening. At BiCS 6, the address will be 6 bytes length, so there are another 5 bytes saved from the duplication in address transmission which equal 30 Bytes+2. The ending of the command can be a different, and the command can then represent if the command is doing a cache operation or non-cache operation. In this case this is a cached operation.

Marker data that is also constant will not be repeated as well. There is no justification to resend the marker data repeatedly. The format is known and the length of the information transmitted between the beginning and the ending is known, so the receiving side can know where the data of the lower page on plane zero is starting and ending and for the other pages as well. If a partial page is used then some sort of length operation can be used. The information will be transmitted once or another way will be found to transmit the marker information. The length also can also be encoded to a few bits that will say which flash memory unit (FMU) is being accessed and what's the length of the FMU. The few bits can be pre-configured to the end of the NAND. Currently the size is only 4K, but extra flexibility can be added for future support to have a different size other than 4K. For example 2K, 1K, ½K or 8K can be used for the operation of data.

Another 10 to 11 bytes can be saved depending on the implementation. Keeping some information on the first line in order to tell which operation is to be executed and majority of the repeated information will be removed, which will cause ten bytes saved. Eleven bytes can be saved if the information on the last line is somehow encoded to the command's opcode or marked using a bit in another available location, if found, and that the end of the command can be marked. The total potential of 6+25 (30 @BICS6)+2+ 11=45 (49 at BiCS6) slow command bytes saving at TLC multi (dual) plane TLC write (for writing 96 KB+ECC of data).

Starting BiCS6 onwards will usually perform four planes operations, instead of the two planes operations. This will double the savings in command bytes transmission. Devices that will run on a QLC technology will also have increased accumulated saving compared to the above TLC example due to having one more page represented in the commands that can benefit from the same improvements.

The time and management saving that will occur due to the elimination in need to switch the bus mode from conventional to TM back and forth unnecessarily is significant. The time and management savings will be added to the improvement achieved due to the compression in the transmitted command size. The improvement will be reflected in two changes of the bus mode instead of 32 when doing four planes QLC write.

Absolute accumulation of this saving can add up to significant values. The motivation is to optimize the communication on NAND bus, in order to increase the efficiency and the performance using a propriety version of the commands, in parallel to supporting the legacy JEDEC format. Savings can be achieved by having efficient command sequences over the NAND bus and having minimum transitions between the legacy and TM bus modes.

FIG. 6D is a diagram illustrating a new TLC command for non-cached operations, according to certain embodiments. To send the opcode and the address using a conventional mode, and then return to the toggle mode (the fast mode) and send the data of all the planes and all the pages. Once the data is finished, send just the command ending which can be sent or can be skipped. The command ending will be skipped if recorded into the TLC-WRITE_OPCODE_START. The command part that is transmitted using conventional mode (slow data rate) is surrounded in single ">". The data part that is transmitted using TM (fast data rate) is surrounded in double ">>". Using this scheme, many slow command bytes sent over the bus using slow clock will be saved. The bus transmitting mode changes from conventional mode to TM, will be only two times, instead of 32, in the example of four planes QLC write.

Figure 7A:
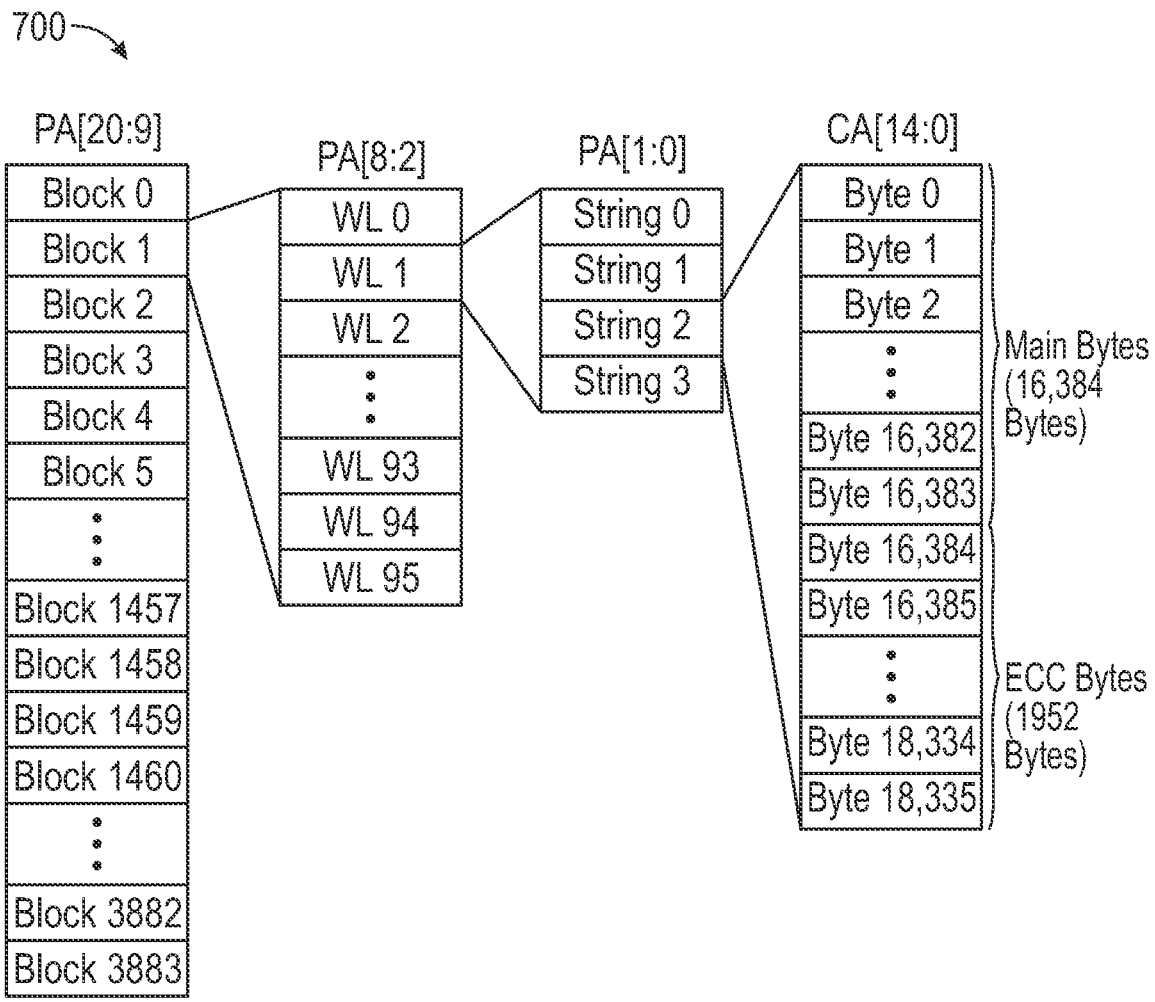
FIG. 7A is a diagram illustrating a system for command address shortening, according to one embodiment.

FIG. 7A is a diagram illustrating a system 700 as used by the legacy standard and may be optimized using command address shortening improvement, according to one embodiment. The command's format of system 700 includes the address to be operated on. Read (sense) and write (program) commands use a 5 bytes addressing scheme (and in some cases 6 bytes addressing scheme). A command address is the address transmitted over the bus, which tells the device on which address we want the operation to be carried on. The address has the information on which block the operation is to be built. The operation will know which word line and which string line form the address. The address will tell what is the offset in the page is and when the start the operation. This offset is encoded into address bytes 0.1 (CA[14:0]), as demonstrated in FIG. 7A, in some embodiments. If a full page operation is executed, then the offset will always be 0.

Figure 7B:
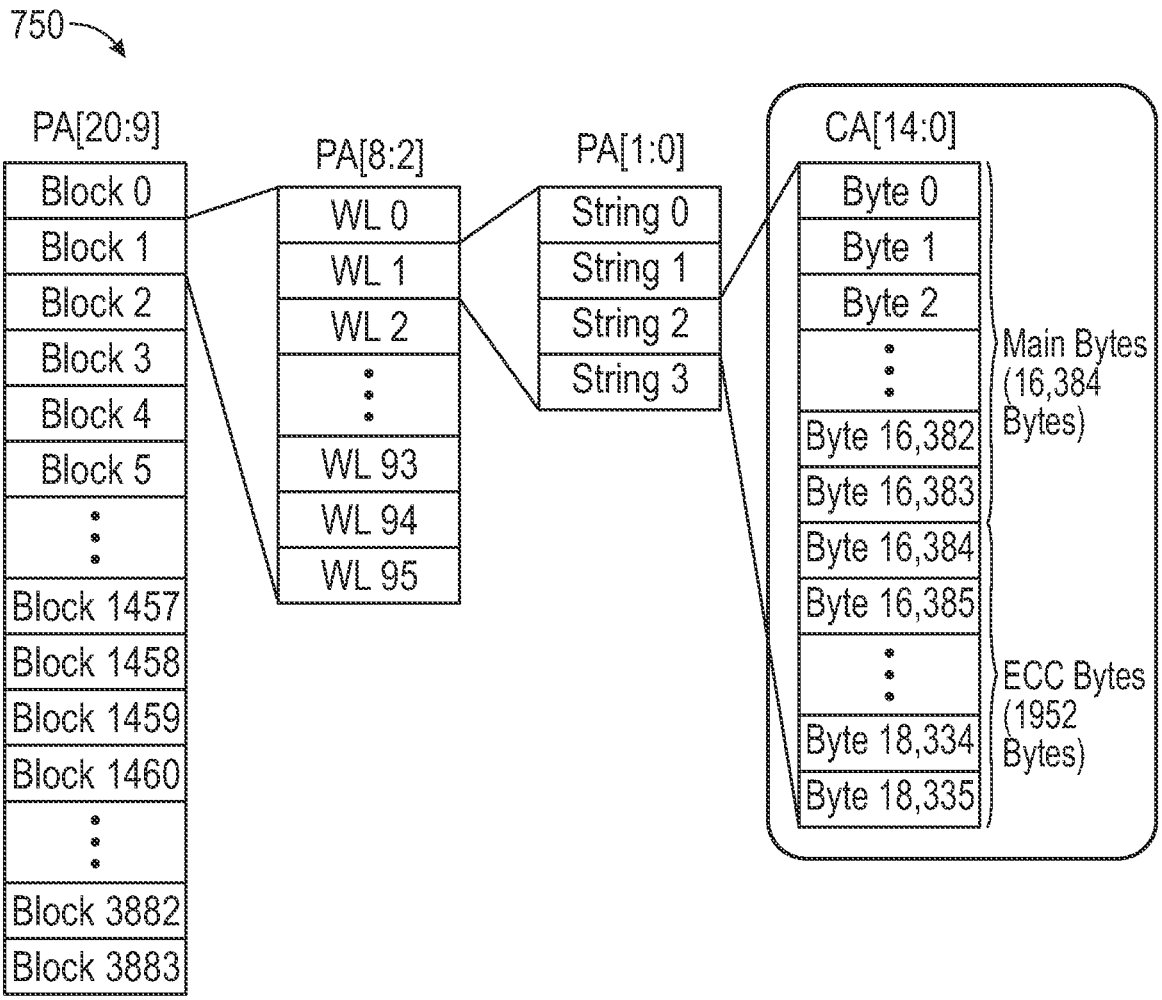
FIG. 7B is a diagram illustrating a system for command address shortening, according to one embodiment.

FIG. 7B is a diagram illustrating a system 750 for command address shortening, according to one embodiment. The use of the column address (represents the page offset), is represented in bits CA[14:0], located in the first and the second address bytes maps 32K address space and allow read and write access directly to each page offset within the 16K+ECC address space. When using the NAND, of the smallest units of operations is 1 FMU (4K in most implementations, but may be smaller)+its data validity signature (e.g. parity). The information carried in CA[14:0] can represent offset of up to 32 KB in a page, —this address space is needed to support 16 KB (4*4K as we have 4 FMU in one page and each FMU is 4 KB in size)+the space needed for the ECC data. The address defined using the 15 bits CA[14:0] allows in-page offset of 1 byte resolution in range of 32K (16K+ECC data) for write/read operation. However this 1 byte resolution is not needed as NAND operations are only starting at few in-page specific offsets due to the fact that the granularity of operations is always done in granularity of full FMUs (in other embodiments other granularity may be used or FMU size may change from 4K to other value, as well as the length of the data validation signature (e.g. parity).

So for using FMUs at size of 4K, we can start the write/read to the page at the beginning of it, after quarter of the age, at the middle of the page or at offset of ¾ of the page size, and that's it because we only can do write/read operation on 1, 2, 3, or 4 FMUs in a page. Four FMUs are filling up a full page. For a partial page operation, the start offset can be at any offset in the page: 0, the quarter, the middle, and the three quarter offset of the page. For a full page operation all 15 bits are not needed as there is no offset in the page for a full page operation: The address will always be 0. If a NAND operation is done on a full page, then the information in the first two address bytes using slow data rate can be eliminated (instead of always sending the value of 0 in these 2 bytes).

On a partial page, two bits are needed to represent the 1 of 4 possible in page offsets (and more in case that higher granularity may be needed, according to the embodiment). So instead of sending the 15 (bits CA[14:0]) that describes the operation's in-page offset using byte resolution—at bytes 0 . . . 1 in the address section, only 2 bits (or just a few, depending on the needed resolution)—are needed to be sent. At least 1 byte and up to 2 bytes can be saved from the address, which is transmitted over the ASIC-NAND but using slow data rate (conventional mode).

Figure 8A:
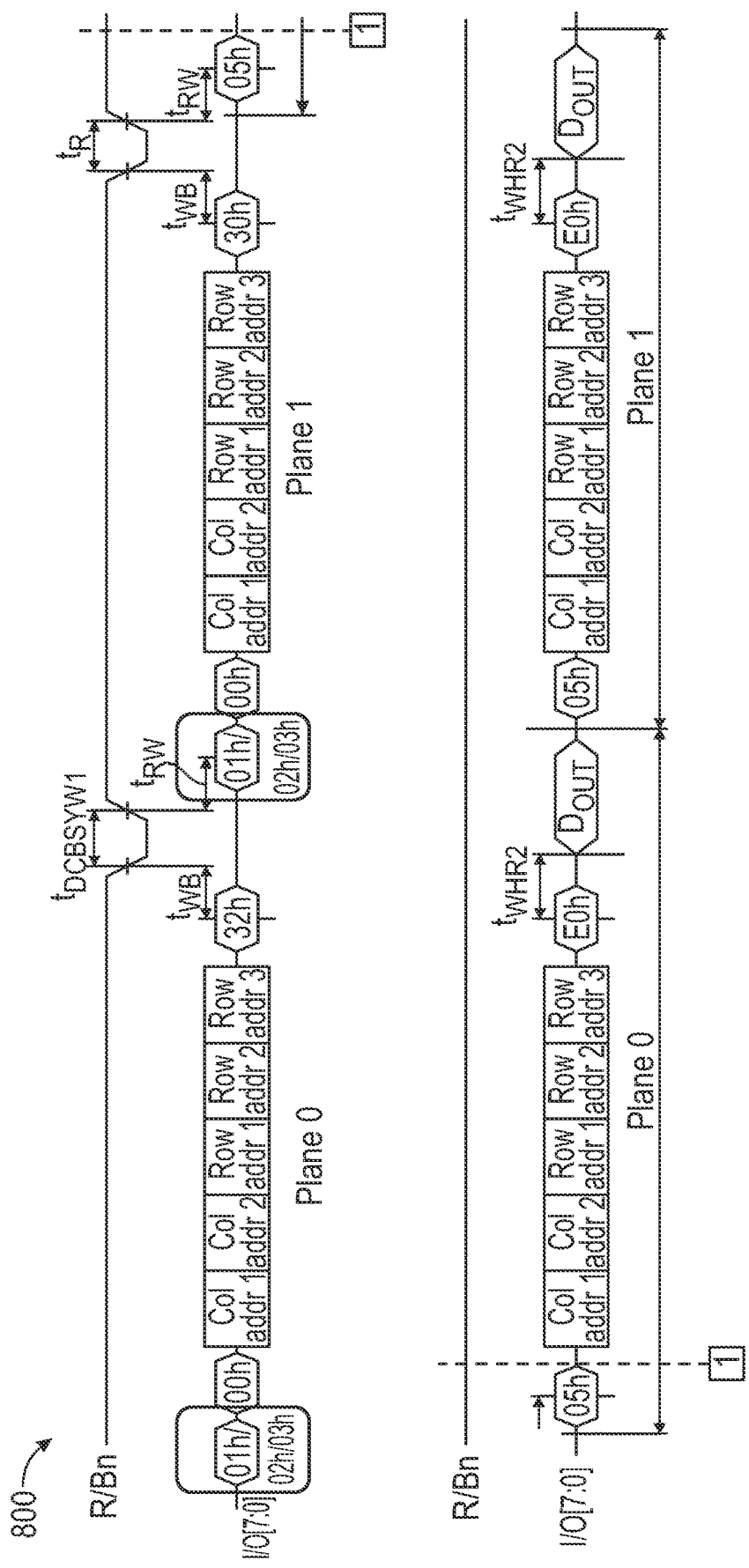
FIG. 8A is a diagram illustrating a multi-plane TLC read, according to certain embodiments.
Figure 8B:
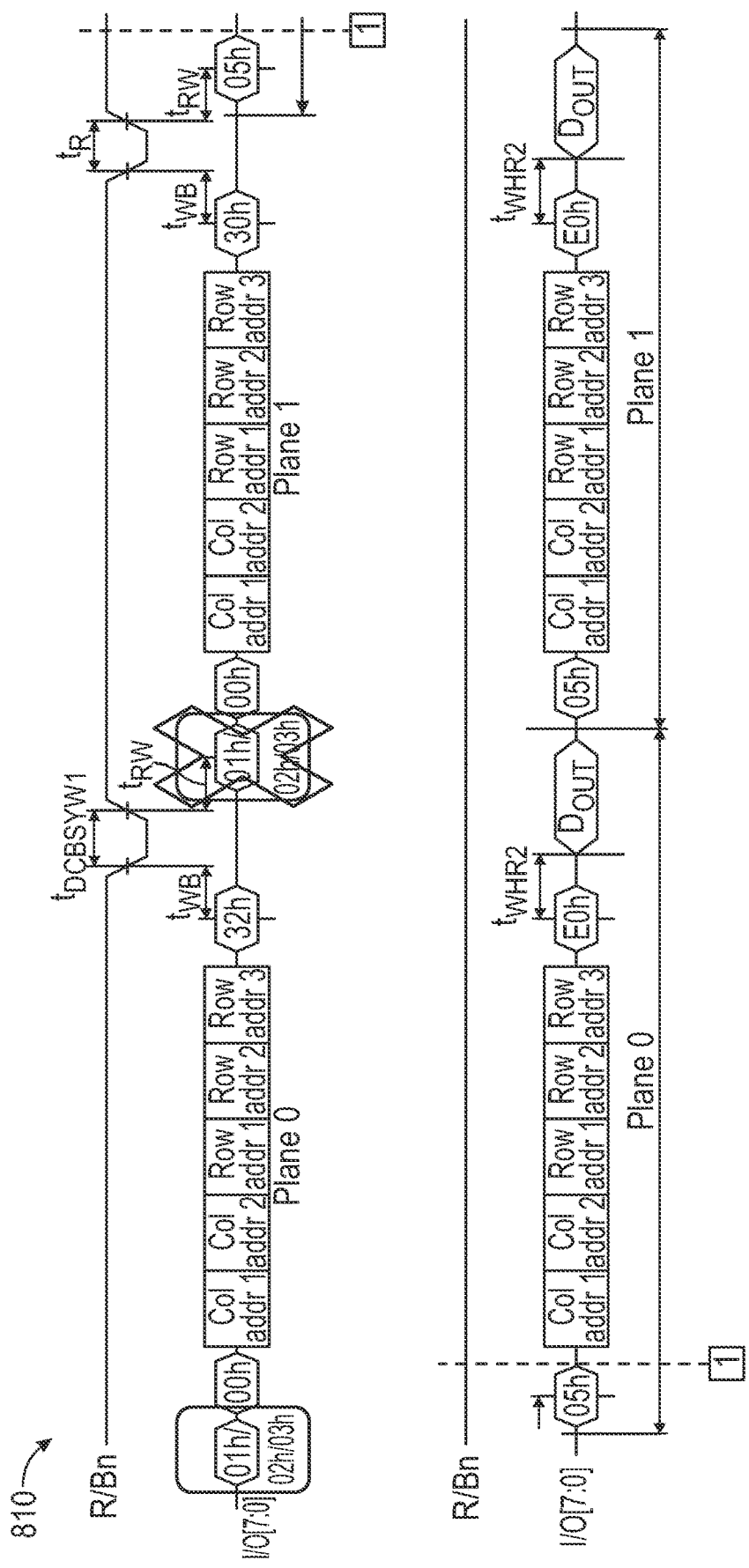
FIG. 8B is a diagram illustrating a multi-plane TLC read, according to certain embodiments.

FIG. 8A is a diagram illustrating a multi-plane TLC read 800, according to certain embodiments. The circled values 01h/02h/03h marks the selected page to be read. However, at the common use cases the page value of plane 1 have the same as the value of plane 0. For these common use cases there is no need for sending the same information 2 times on the bus and unnecessarily spend expensive bus time. In this example, avoiding sending the same information twice, can allow to save the time and power needed to transmit 1 command byte during the command phase (which is sent at low data rate) for 2 planes operation. This improvement increases in case the command is sent to a system that has >2 planes, e.g. saving is increased to 3 command bytes for a 4-plane command. This idea of not sending repeated commands bytes for all planes can be applied in this example of multi plane read, and in cases of other multi planes commands. The option to switch back to the legacy command's format can be used to keep the flexibility of different values, if/when such flexibility will be needed. FIG. 8B shows the saved byte (marked with an X) in the example of 2 planes command.

FIG. 8B is a diagram illustrating a multi-plane TLC read 810, according to certain embodiments. The values 01h/02h/03h circled marks the selected page to be read. However, the page value of plane 1 should always have the same as the value of plane 0. There is little support for sending information and spending expensive bus time to send information twice. By avoiding sending the same information twice, the data saved during the command phase is one command byte for dual planes, three command bytes for four planes, etc. The legacy command can be used to keep the flexibility of different values, if the legacy command is needed.

Figure 8C:
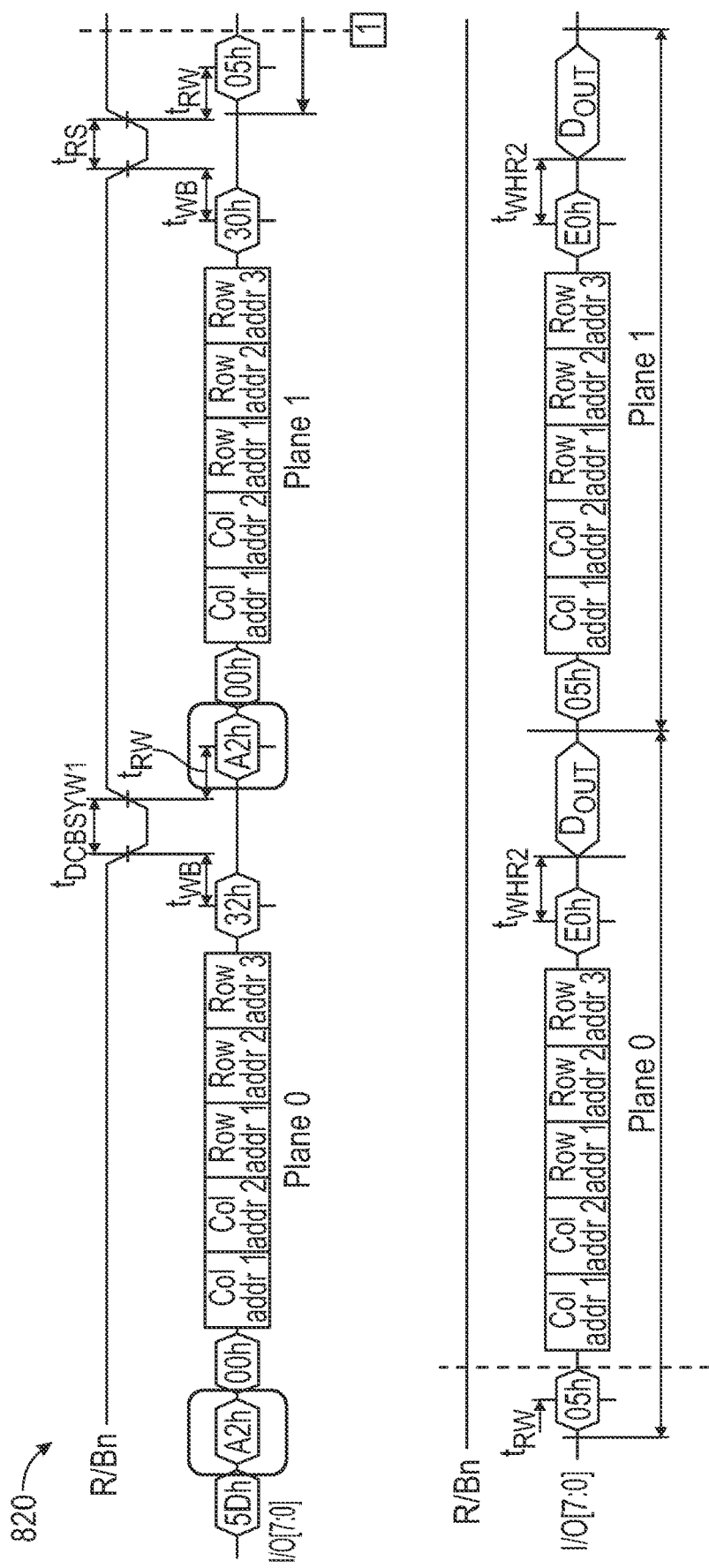
FIG. 8C is a diagram illustrating a multi-plane SLC read, according to certain embodiments.

FIG. 8C is a diagram illustrating a multi-plane SLC read 820, according to certain embodiments. The values A2h circled marks that the multi-plane SLC read 820 is a SLC operation. However when there is a multi-plane operation, the multi-plane operation is done on either SLC or TLC (or QLC—future devices, etc.). Since the page type will always be the same for all planes, once the page type is known, there is no need to send this data twice. Furthermore, if the command opcode is for "multi-plane SLC read", both the "A2h" bytes can be saved. Alternatively, a page type selection using a separate command can be sent, and the selection will remain the same until changed. Data saved during the command phase is one or two command bytes according to the implementation. Even though this is an example of a dynamic SLC multi-plane command, the process still applies to non-dynamic actions as well. In cases of more than 2 planes the save in the need to send more duplicated bytes will increase even further. Since the A2h is repeated as seen in FIG. 8C the second A2h is removed indicated, by the "X" illustrated in FIG. 8D.

Figure 8D:
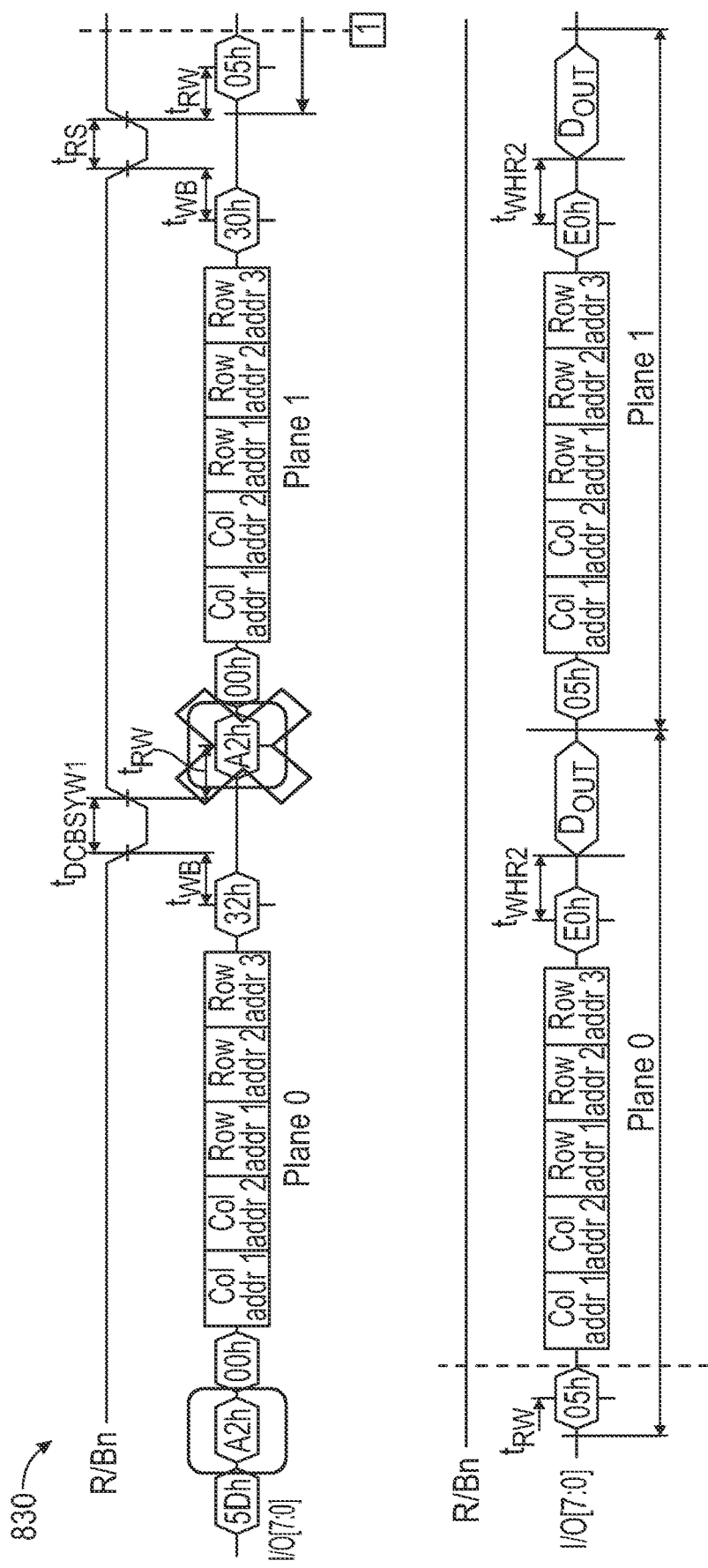
FIG. 8D is a diagram illustrating a multi-plane SLC read, according to certain embodiments.

FIG. 8D is a diagram illustrating a multi-plane SLC read 830, according to certain embodiments. The values A2h circled marks that the multi-plane SLC read 830 is a SLC operation. However when there is a multi-plane operation, the multi-plane operation is done on either SLC or TLC (or QLC—future devices). Once the page type is known, there is no need to send this data twice. Furthermore, if the command opcode is for "multi-plane SLC read", both the "A2h" bytes can be saved. Alternatively, a page type using a separate command can be selected that will remain the same until changed. Data saved during the command phase is one-two command bytes. Even though this is an example of a dynamic SLC multi-plane command, the process still applies to non-dynamic actions. Since the A2h is repeated as seen in FIG. 8C the second A2h is removed indicated, by the "X".

Figure 8E:
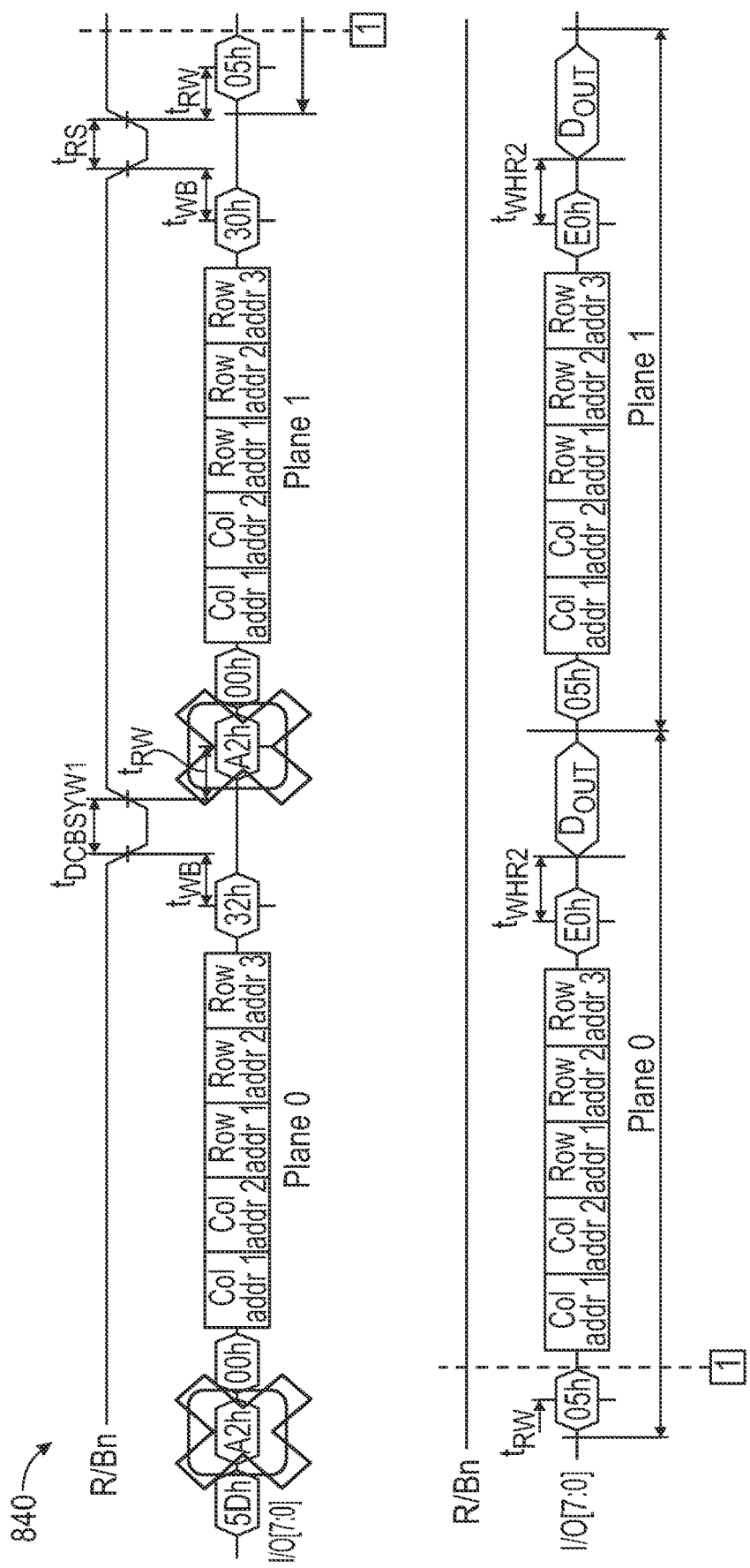
FIG. 8E is a diagram illustrating a multi-plane TLC read, according to certain embodiments.

FIG. 8E is a diagram illustrating a multi-plane TLC read 840i, according to certain embodiments. The values A2h circled marks that the multi-plane SLC read 840 is a SLC operation. However when there is a multi-plane operation, the multi-plane operation is done on either SLC or TLC (or QLC—future devices). Once the page type is known, there is no need to send this data twice. Furthermore, if the command opcode is for "multi-plane SLC read", both the "A2h" bytes can be saved. Alternatively, a page type using a separate command can be selected that will remain the same until changed. Data saved during the command phase is one-two command bytes. More bytes can be saved in the case of four planes or more. Even though this is an example of a dynamic SLC multi-plane command, the process still applies to non-dynamic actions. Both the first A2h and the second A2h are removed, indicated by the "X".

Figure 8F:
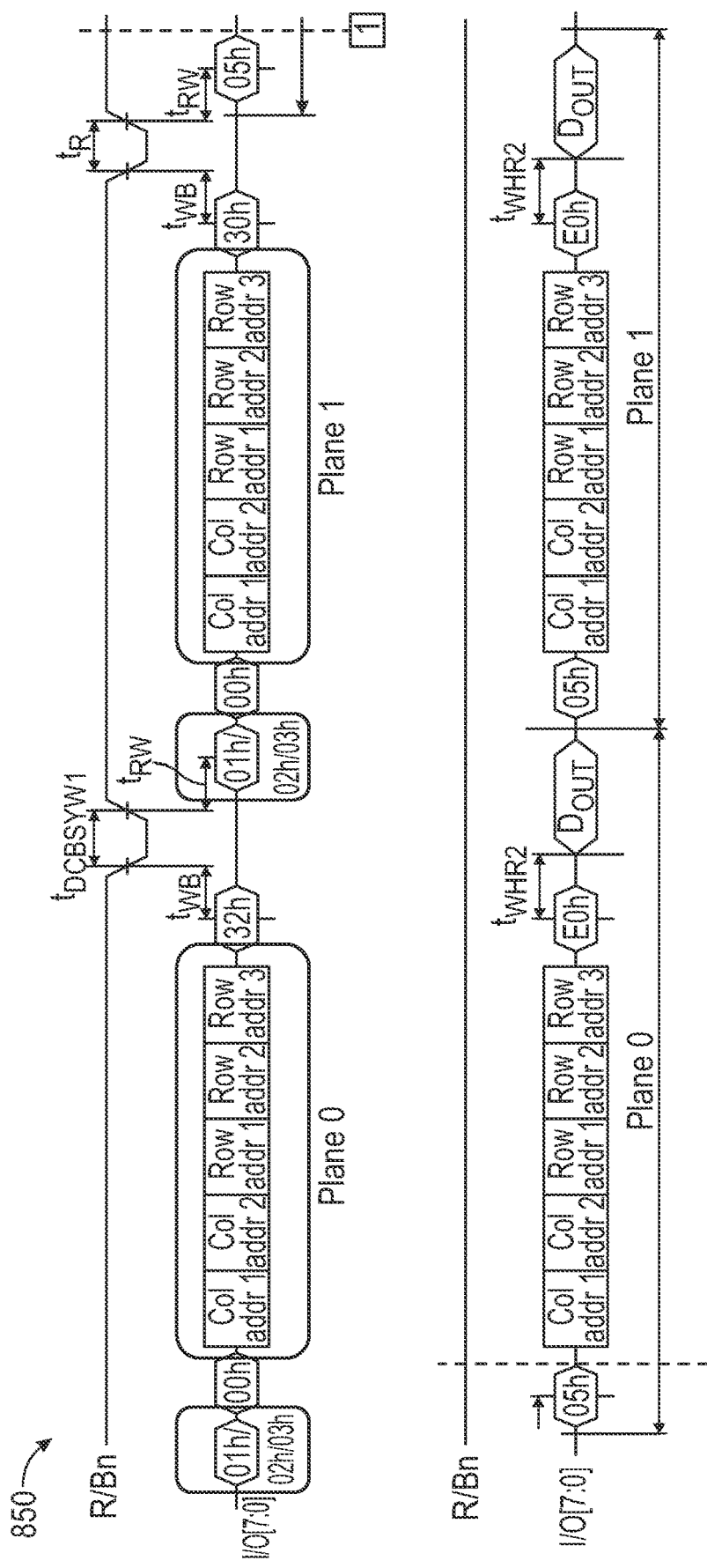
FIG. 8F is a diagram illustrating a multi-plane TLC read, according to certain embodiments.
Figure 8G:
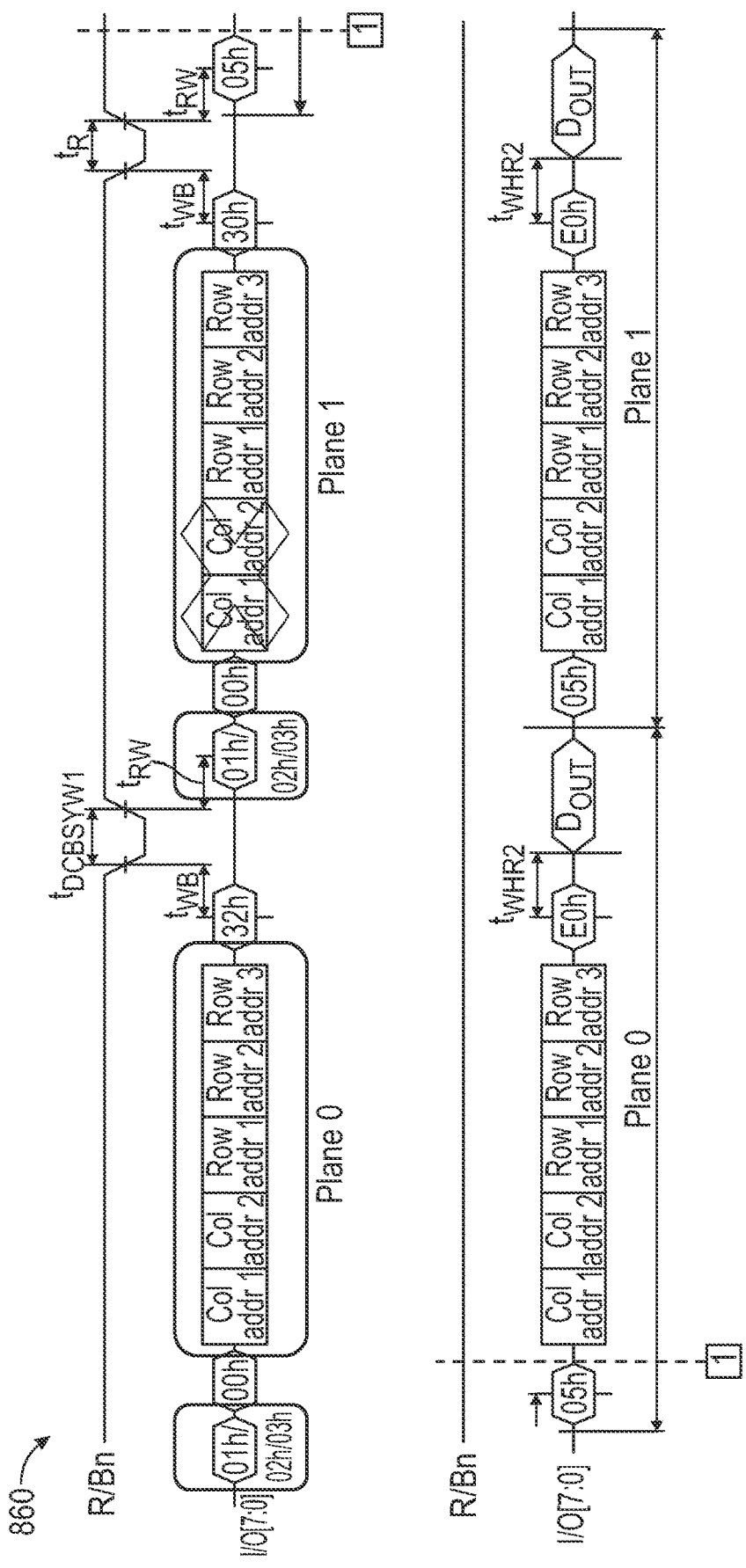
FIG. 8G is a diagram illustrating a multi-plane TLC read, according to certain embodiments.

FIG. 8F is a diagram illustrating a multi-plane TLC read 850, according to certain embodiments. If the same address is used for plane 0 and plane 1 (not in AIPR mode) the address for both plane 0 and plane 1 can be sent once, at least at the sense command. Data saved during the command phase saves 5 or 6 command bytes at a slow clock rate (6 bytes for devices with size >1 TB). FIG. 8G illustrates such a saving: the repeated address is removed—illustrated by the "X" in the figure. This improvement is also relevant and can increase the saving for future quad (or more) planes architectures, when not using AIPR mode—e.g for 4 planes device the saving can come to 6 bytes×3 planes—18 address bytes that are unnecessarily sent in some scenarios and can be saved.

FIG. 8G is a diagram illustrating a multi-plane TLC read 860, according to certain embodiments. If the same address is used for plane 0 and plane 1 (not in AIPR mode) the address for both plane 0 and plane 1 can be sent once, at least at the sense command. Data saved during the command phase saves 5 or 6 command bytes at a slow clock rate (6 bytes for devices with size >1 TB). Also, relevant for future quad (or more) planes architectures, when not using AIPR mode. Since plane 1 is using the same address as plane 0 the command of plane 0 between 01 h and 30h can be removed as indicated by the "X".

Figure 8H:
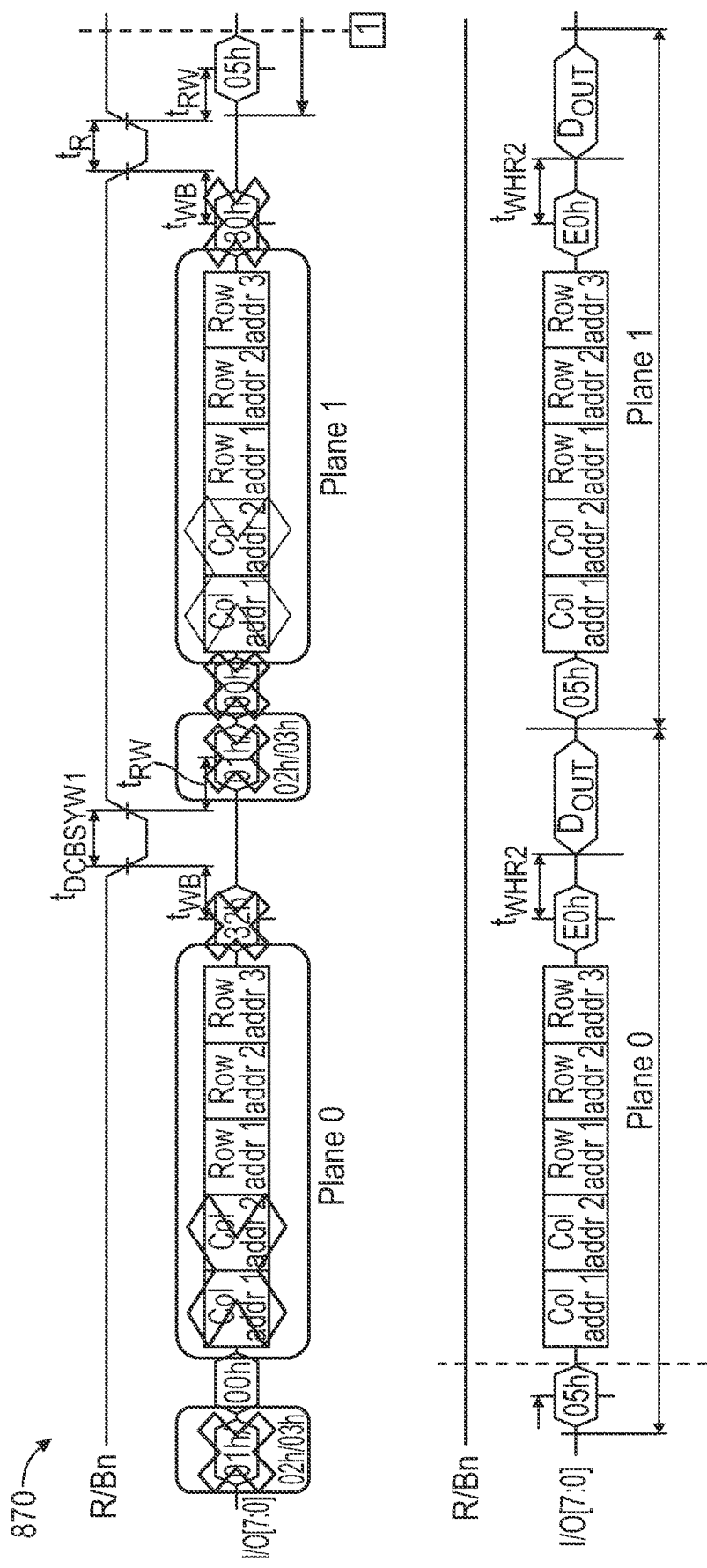
FIG. 8H is a diagram illustrating a multi-plane TLC read, according to certain embodiments.

FIG. 8H is a diagram illustrating a multi-plane TLC read 870, according to certain embodiments. If the same address is used for plane 0 and plane 1 (not in AIPR mode) the address for both plane 0 and plane 1 can be sent once, at least at the sense command. Data saved during the command phase saves 5 or 6 command bytes at a slow clock rate (6 bytes for devices with size >1 TB). Also, relevant for future quad (or more) planes architectures, when not using AIPR mode. Since plane 1 is using the same address as plane 0 the command of plane 0 between 01 h and 30h can be removed as indicated by the "X".

The setting of whether to enable or to disable one or more optimizations can be set with the preceding markup of the multiple commands format using set-feature preceding command. For example, the command's parameters will define which optimization is enabled and which one is not (using legacy format), or which command format to use.

Since the length of the address is known, the 01h, column address 1, and column address 2 can all be removed from plane 0 and plane 1. The 32h from plane 0 along with 00h, 30h and all of the row addresses can be removed from plane 1 when the operation is not of type AIPR (Asynchronous Independent Plane Read). Marking that both (all) planes used the same address can be marked using a bit in the command's opcode. Few bits can be used to encode the type (SLC/MLC/QLC, etc.) and the page (U/M/L) into the command's opcode instead of the bytes that repeat the page information for all planes, since normal operation does not mix working with different pages/block types at the same command. The end of the command (30h) can be removed if we will use commands that have known length. The command length may be defined by the number of FMUs encoded into few bits in the new command format, or ALE line can be used to help to determine the command's length.

Figure 9:
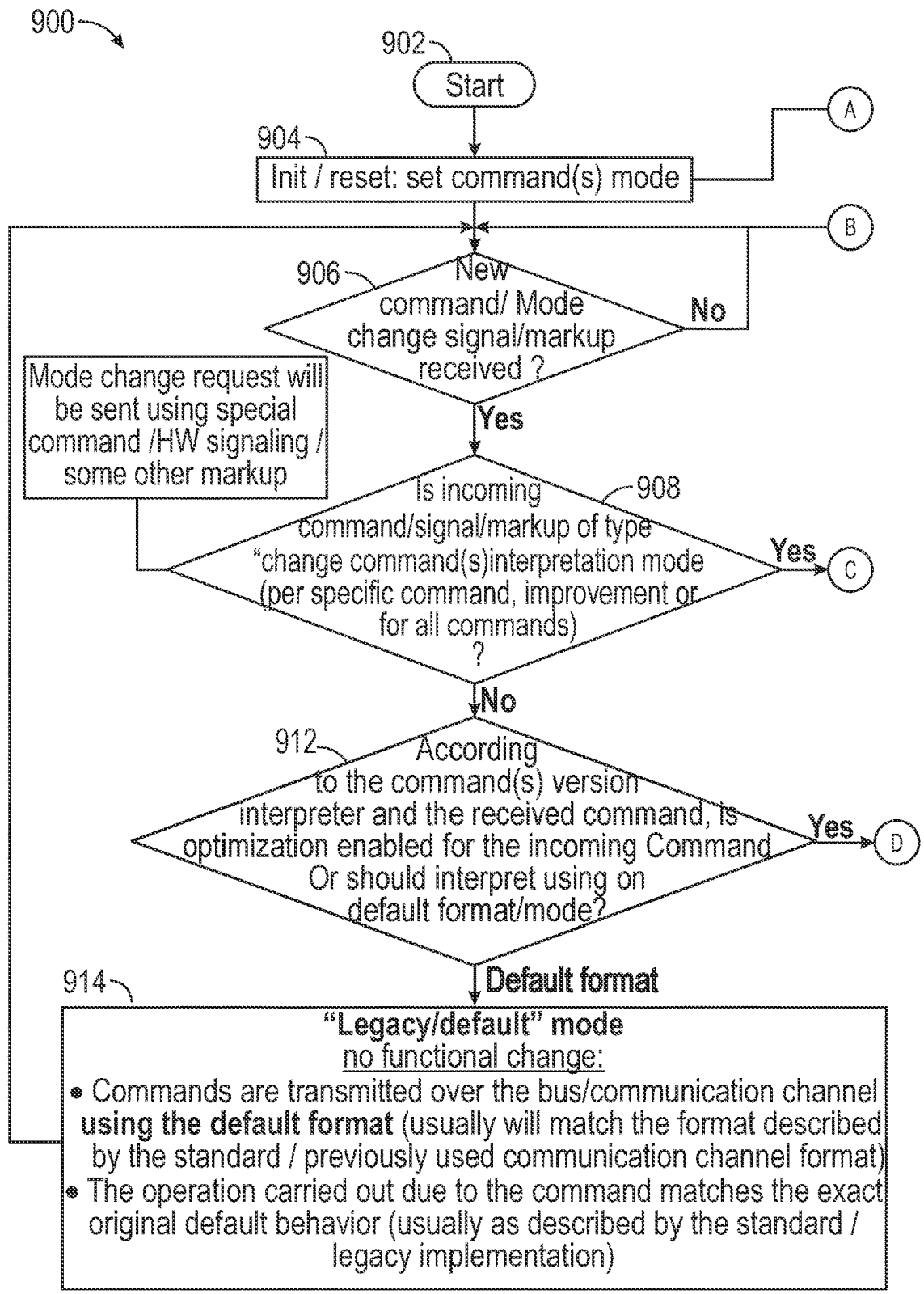
FIG. 9 is a flowchart illustrating a method for handling incoming commands, according to certain embodiments.
Figure 9:
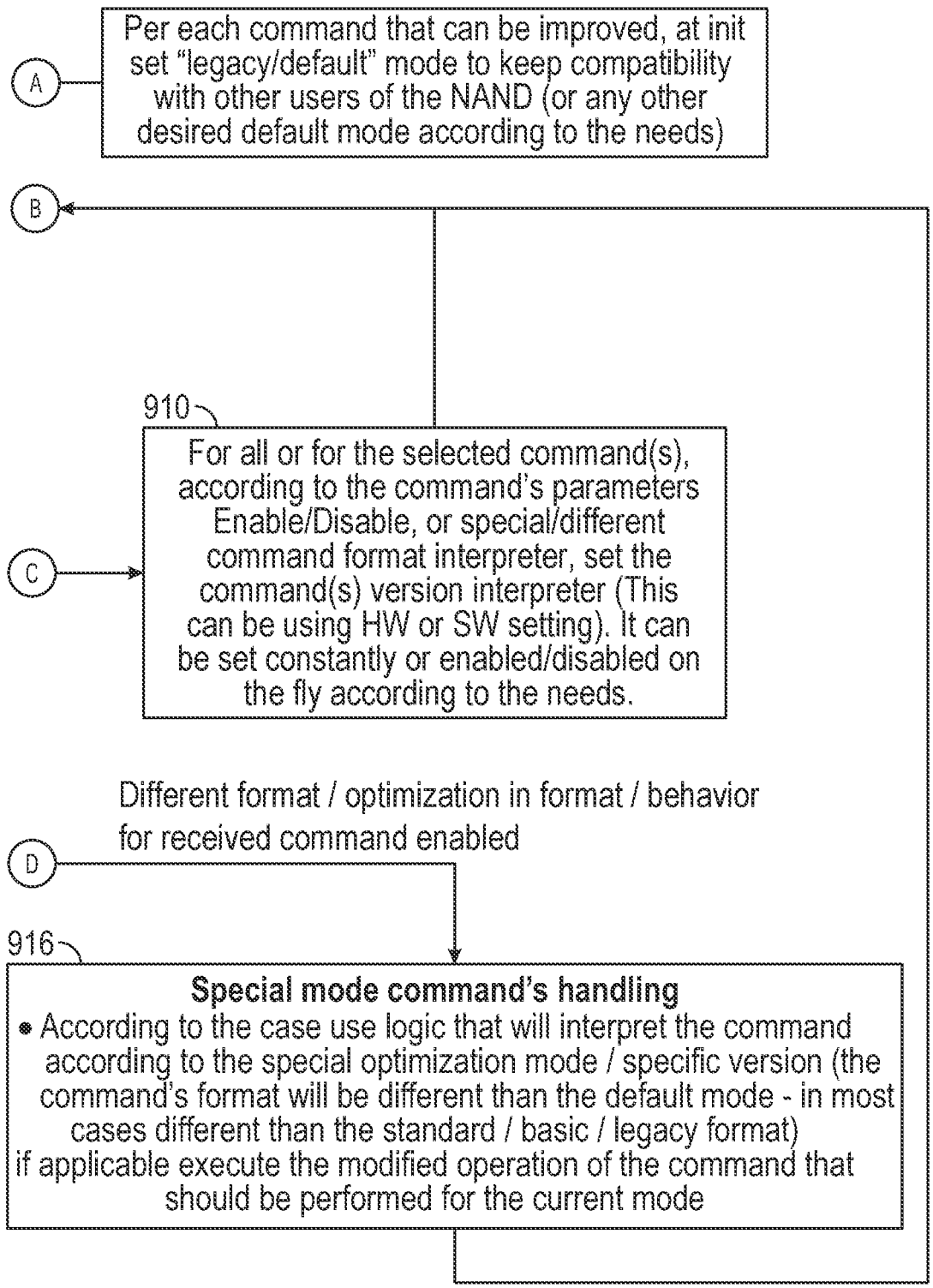

FIG. 9 is a flowchart illustrating a method 900 for handling incoming commands on the NAND side, according to certain embodiments. The method 900 allows switching between different commands interpretation modes. Note that the mode changes signaling can come in different forms, and is not limited to a command running on the bus only. Note that the suggested implementation of method 900 is defining one embodiment for working according to the selected mode, but the implementation of the command interpretation and execution according to the working mode/selected command scheme can have different forms.

The mode change can be learned and alter the command interpretation's HW/handling function pointer, etc. so that it will not be asked for each command which command version to use—and the interpretation will be done automatically with the activated/pointed handling logic—so mode change can be done to alter some settings in the NAND and when a command is received the interpretation will be done using the existing setting without asking question 912.

The ASIC side will send, if desired, a preceding mode change markup, so that the NAND side will be synced on the format that will be transmitted over the bus for the relevant commands. The format change request will usually be sent once, before the communication will start. If not sent, then the default format should be used on both the ASIC and the NAND. Changes in the commands scheme can be sent also "on the fly", during the operation of the device, for example in order to activate/deactivate some optimizations for specific scenarios and use cases. The ASIC will build the command and the parameters for the NAND according to the declared/default format by using the appropriate encoding scheme of the commands. Supporting new formats by the ASIC side and encoding the command that will be transmitted over the ASIC-NAND bus according to the active encoding scheme will be implemented by the ASIC side. In some embodiments, this will be implemented by the FW in the LLFS layer and/or in the FIM driver.

The changes in the NAND side will be small and simple as well. When needed, the "glue-logic" will alter the way that the affected commands are interpreted and/or the resulted outcome of the received command to fit desired format/functionality. The resulting outcome is according to the matching requested format, as directed by the preceding mode change markup or use the default interpretation in case that no mode change request was sent.

The suggested implementation aims to keep the NAND design changes minimal, so that the additional "glue-logic" will hide the change of the command's format from the majority of the current NAND device's implementation by reflecting to the NAND the parameters that will be extracted from the optimized format in the same way the parameters were reflected from the default/original/standard format. This will keep the overall change small, simple, isolated from most of the current NAND design, and easy to implement and integrate with the current NAND implementation.

The suggested implementation allows using both the original opcodes version, as defined by the standard, which is required in order to support other users of the NAND dies (e.g. other vendors that use the same NAND dies), and the modified, improved/shorter version(s) of the commands. The preceding mode change markup will allow to use multiple settings. The setting can be, but not limited to, enable/disable improved version of command(s) and commands format versioning (change the interpretation of commands to specific selected version from a list of available options). Enabling of different commands interpretation can be applied on all the incoming commands, on a group of selected commands, per each command, or per command's specific change, in case of several changes in the command and the desire to allow separation of them. Using the command's interpretation mode change mechanism allows for the possibility to keep backward compatibility, that is expected to be used by default after the NAND dies will power up. The command's interpretation mode change mechanism can serve to hide this improvement from competitors that may be using the same NAND device and will not be aware to it, or for any other reason.

Using general cases allows for flexibility between the previously used formats, while having the advantages of the new format(s) with all their benefits. Such general cases for example are using pre-implemented future implementation once a need for such improvements/features will become relevant. Rolling back to the legacy format will be possible in case of any bug or difficulties in using the implementation of the improved formats. Selecting the best format that will fit well to different scenarios that the device should support is also optionally available (the case is an example for when the command format selection can be changed on the fly). Redefining the format and or behavior of existing opcodes in the JEDEC standard allows implementation of the changed version of commands using the original opcode, without being depended on or limited in the available opcodes. Each opcode can have zero, one, or more versions/improvements that can be selected, enabled or disabled, according to the case and the desired needs. The available opcodes mentioned before are opcodes that can be used for propriety implementation of improved commands now and in future versions of the JEDEC standard.

The method 900 begins at block 902. At block 904, the commands mode is set. The setting can be general for all commands (select all commands version), or per command (command version) or per feature/format change/improvement (feature enable/disable/version). Per each command that can be improved, the command is set during reset to "Legacy/default" mode to keep compatibility with other users of the NAND (or any other desired default mode according to the needs). It is important that the reset on the NAND side will be known at the ASIC side in order to keep both the ASIC side and the NAND side in sync about the working mode/active command(s) version/setting. At block 906, the memory device, determines whether new command/signal/markup is received. If the memory device determines that a new command/mode change signal/markup is not received, then method repeats block 906. If the memory device determines that a new command/mode change signal/markup is received, then method proceeds to block 908. At block 908, the memory device determines whether the incoming new command/mode change signal/markup changes the commands interpretation mode (per specific command, per specific format/behavior change, or for all commands). Mode change requests will be sent using special command/HW signaling/some other markup.

If the NAND determines that the commands interpretation mode changes, then method 900 proceeds to block 910. At block 910, for all or for selected commands, according to the command's parameters enable/disable special/different command format interpreter, or set the command version interpreter. This is done at the NAND side, and can done using hardware (HW) or software (SW) setting. The command format interpreter can be set constantly or enabled/disabled on the fly according to needs. At the completion of block 910, method 900 returns to block 906. If the controller determines that the commands interpretation mode doesn't change, then method 900 proceeds to block 912. At block 912, the controller determines whether optimization(s) is (are) enabled for the incoming command or if it should interpret and act on the command using default format/mode and default command's operation.

If the controller determines optimization is not enabled and/or should not interpret using default format/mode, then the method 900 proceeds to block 914. At block 914, commands are transmitted over the ASIC-NAND bus/communication channel using the default format (usually will match the format described by the standard/previously used communication channel format). The operation carried out due to the command matches the exact original default behavior (usually as described by the standard/legacy implementation). At the completion of block 914 method 900 returns to block 906. If the controller determines optimization is enabled and/or should interpret using default format/mode, then the method 900 proceeds to block 916. At block 916, according to the case, use logic that will interpret the command according to the special optimization mode/specific version (the command's format or the resulted behavior due to receiving the command will be different than the default mode—in most cases different than the standard/basic/legacy format) and, if applicable, execute the modified operation of the command that should be performed for the current mode.

Figure 10A:
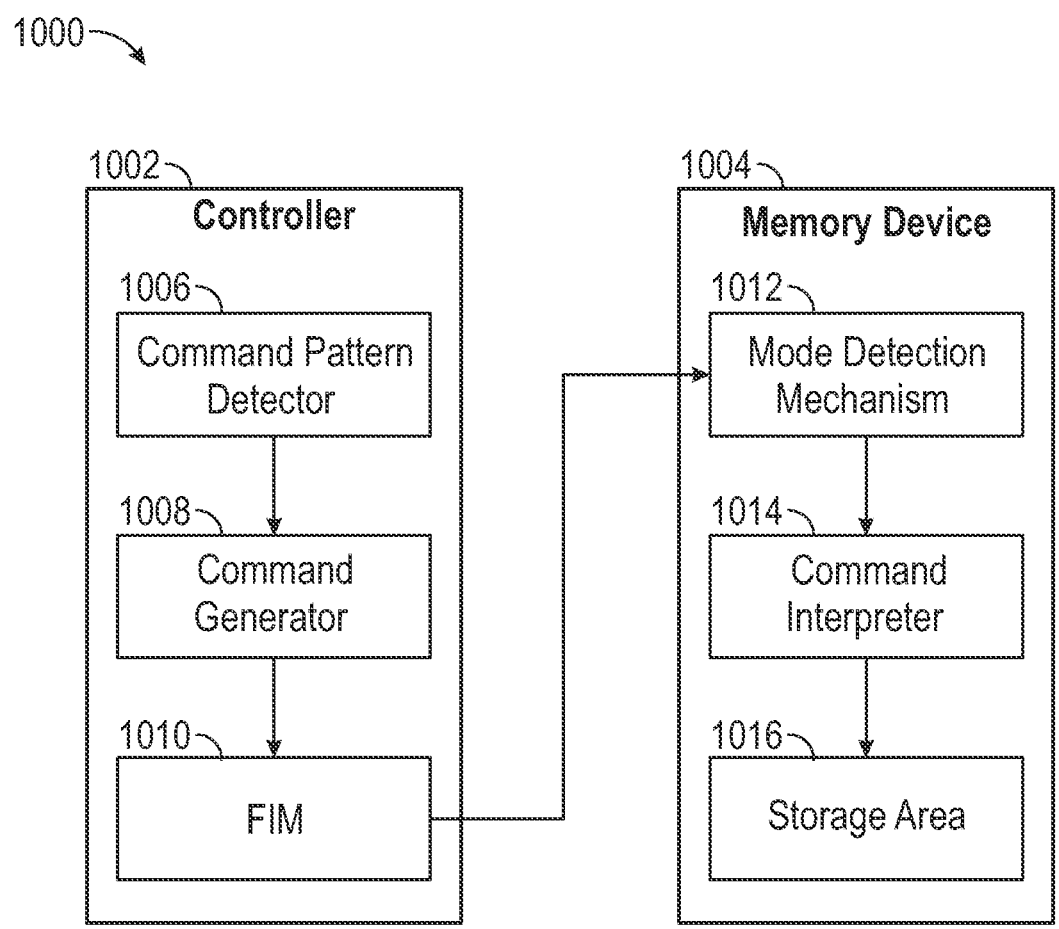
FIG. 10A is a diagram illustrating a system for multi-command format support, according to certain embodiments.

FIG. 10A is a diagram illustrating a system 1000 for multi-command format support, according to certain embodiments. System 1000 comprises a controller 1002 and a memory device 1004. The controller 1002 further comprises a command pattern detector 1006, a command generator 1008, and a FIM 1010. The memory device 1004 further comprises a mode detection mechanism 1012, a command interpreter 1014, and a storage area 1016. It is contemplated that mode change may be communicated through a command or other method.

In some embodiments, there may be some pattern detectors 1006, but in the conventional mode of operation, according to the decided setting/working mode/enabled compression/improvements/format changes, the command generation module will encode the command to be sent. It will usually not compress a command that was not encoded, and will not encode it in a long format and then 'compress' it. The command pattern detector 1006 refers to checking which format to use. It is to be understood that the use of LLFS+FIM is just one embodiment for a command generation+transmission module.

Figure 10B:
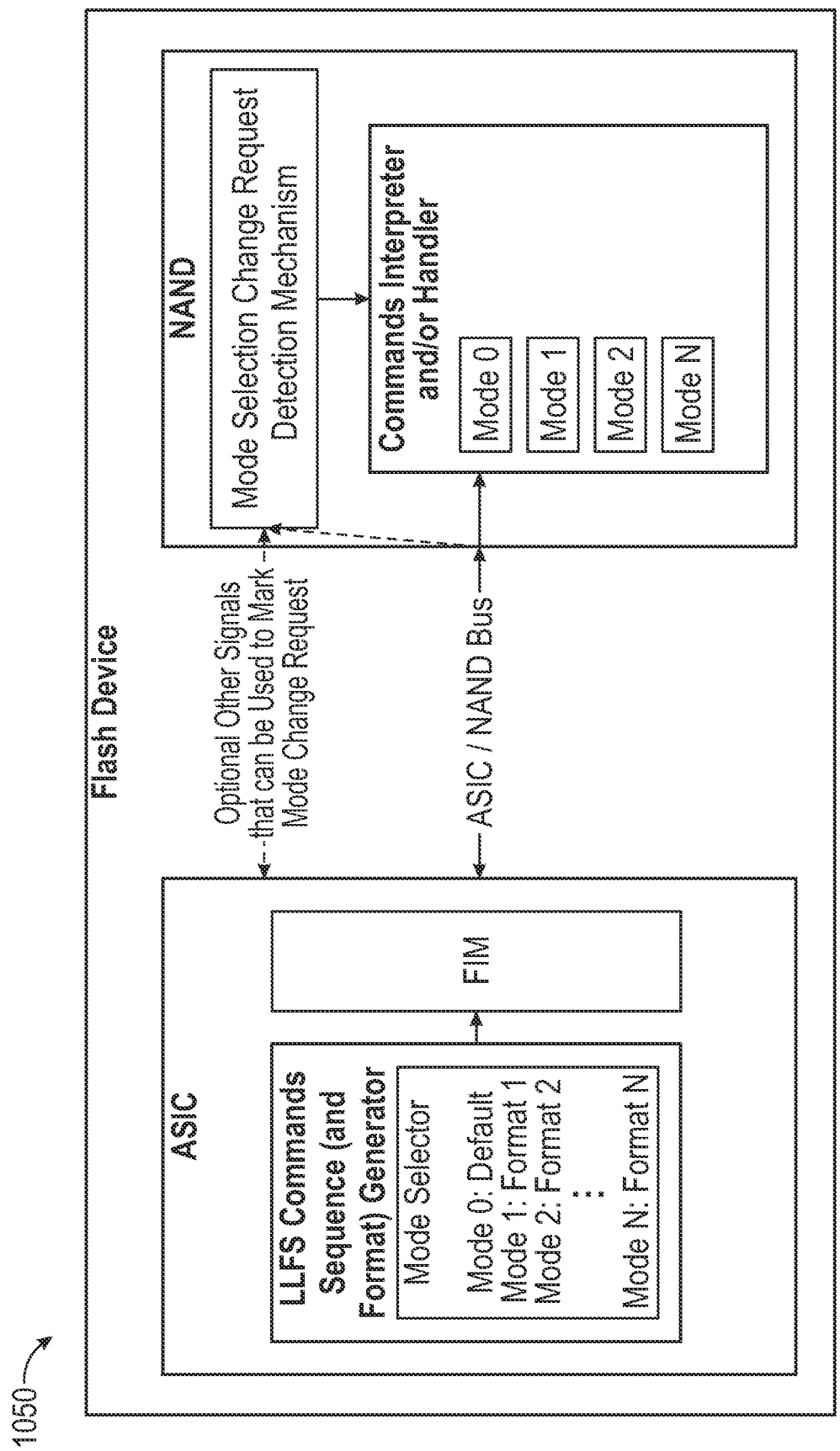
FIG. 10B is a diagram illustrating a system for multi-command format support, according to certain embodiments.

FIG. 10B is a diagram illustrating a system 1050 for multi-command format support, according to certain embodiments. The system 1050 comprises a flash drive, which is made from an ASIC (controller) and a NAND. There may be more than one instance of the ASIC and the NAND. The ASIC further comprises an LLFS commands sequence (and format) generator and a FIM. The LLFS commands sequence (and format) generator will encode the traffic to be sent to the NAND according to the selected active mode. It can support plurality of modes that allow support multiple formats of commands encoding, to achieve certain operations on the NAND side. According to the implementation, it may be able to encode and transmit to the NAND a mode change message (markup) before a new mode will be actively used. Alternatively the ASIC can inform to the NAND on mode change using other way/signaling (instead of a command). The NAND further comprises a mode selection change request detection mechanism and a commands interpreter handler. The mode selection change request detection mechanism can detect the mode change request using different kinds of markup, such as a command on the ASIC-NAND bus (e.g. set-feature command), some HW signaling between the ASIC and the NAND, or any other way. The command interpreter handler comprises support for plurality of modes. The ASIC and NAND communication/transfer information across the ASIC/NAND bus.

The ASIC can signal the NAND using a command running on the ASIC/NAND bus. Mode change request will be sent from the ASIC to the NAND using set-feature command or an implementation of different commands, or by some kind of HW signaling which will have some extra additions. Any type of markup will be able to tell the NAND that the ASIC is switching from one format to another format that is different. Implementation of "ACK" on mode change is optional. Also the current mode can be requested by the ASIC from the NAND, and the mode can be reported back on status commands, if specific settings to support that will be implemented (there can be another mode that enable reformatting the status command sent by the NAND to include also the current mode on a status command, and that interprets it on the ASIC side to make sure it matches the selected mode, for example).

The mode change can be also implemented using different, unused opcodes in the standard, by sending a different, unused opcode that will do something similar to the legacy command but will have different command format, or different command execution, though this type of extension is limited due to not having enough available opcodes to support a large variety of improvements. This will be a more limited approach. However, also a combination of the 2 approaches can be used. If the implementation is to be used with different commands opcodes, then the correct place to put the feature must be found. Finding the unused bits in existing commands to mark that some improvement is turned on is more complex as not all commands will have (enough or at all) available unused bits, and the format of the command may change in future versions of the JEDEC standard. Another alternative to use commands compression is to send the commands in their compressed formats using unused/undefined opcodes. However this also may be challenging as the standard may change and start utilizing the opcodes that will be defined for optimization options, so give backward and future support should be maintained (i.e. an unused opcode that will now be used for some improvement should be assured that in future versions of the standard—it will still be available for these improvements in order to allow the future designs to be backward compatible).

Figure 11:
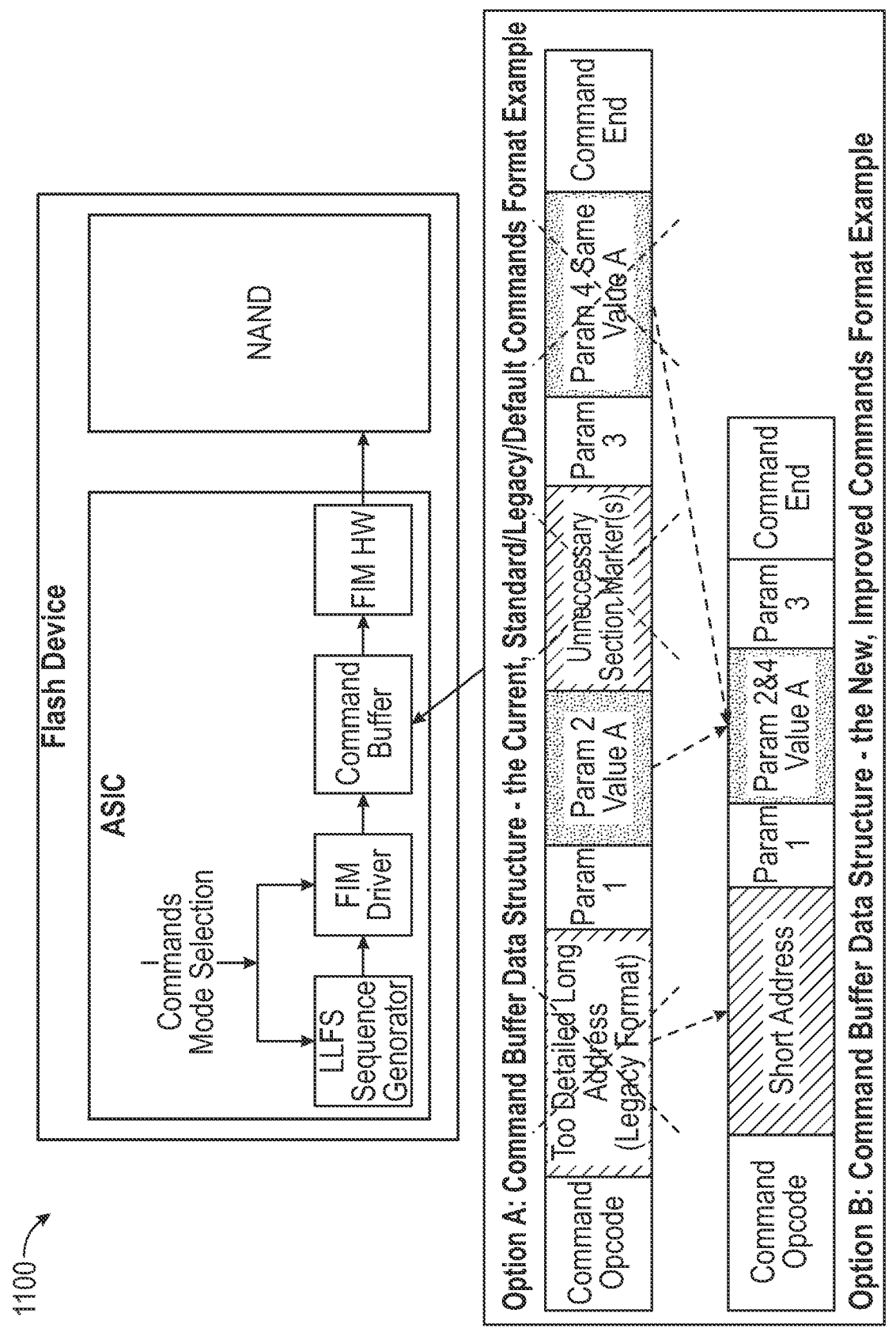
FIG. 11 is a block diagram illustrating a system implementing an ASIC-NAND bus on the ASIC side, according to one embodiment.

FIG. 11 is a block diagram illustrating a system 1100 demonstrating a conceptual improvement in the way that the ASIC composes (encodes) a command to be sent over the ASIC-NAND bus from the ASIC to the NAND side, according to one embodiment. The user data part, which is sent interleaved/with the command is not presented in this figure for simplicity reasons. The implementation of the ASIC using compressed commands is shown in system 1100. The command buffer of the ASIC can either generate the legacy command format, as shown in option A, or encode and transmit the same command using an alternate, compressed/improved format, showed in option B. Option B does not encode repeated information to be sent to the NAND. In the original long command the too detailed long address is removed in the compressed command. The unnecessary section marker(s) is (are) not included in the new compress command format. Parameters 2 (with value A) and parameter 4 (with the same value A) are combined in the compressed command.

Note that alternate format may include also fields that were not available in the standard legacy format, so alternate format will not always be about compression only; it can introduce also new capabilities, or support inter commands compression functionality such as a bit to mark to keep the address in sense command to be used for the following xfer command, or a bit to allow automatically status report without the need to explicitly request for it, or other fields that will allow flexibility and automation of things that are not currently supported by the standard.

Figure 12:
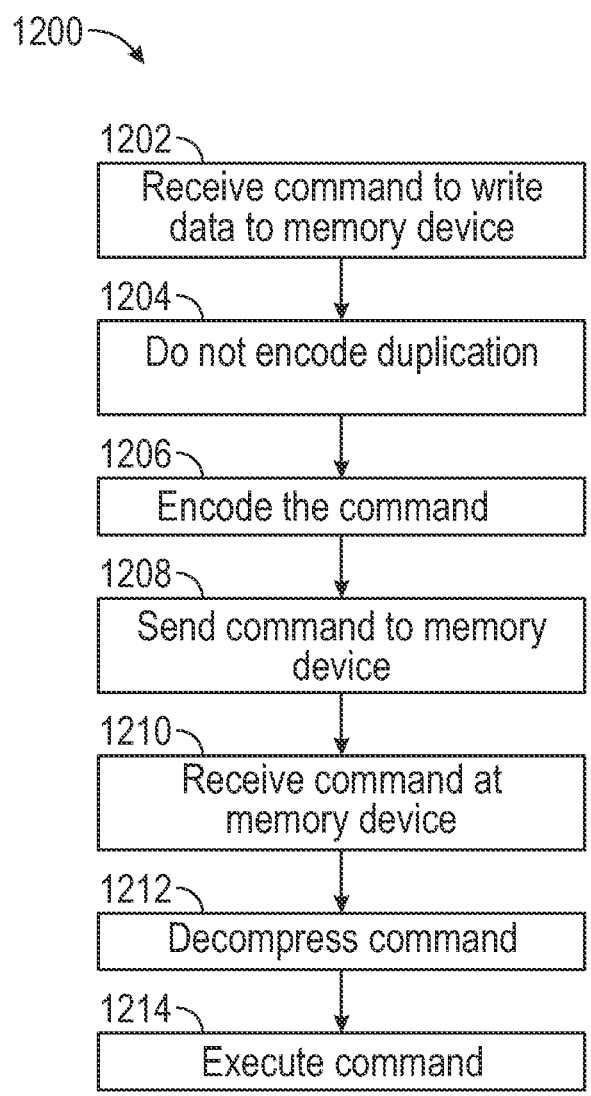
FIG. 12 is a flowchart illustrating a method for command detection, according to one embodiment.

FIG. 12 is a flowchart illustrating a method 1200 for command compression, according to one embodiment. The method 1200 may utilize syncing the fact that compressed command is about to be sent with the NAND. The method 1200 begins at block 1202. At block 1202, the controller, such as the controller 108 of FIG. 1, receives a command to write data to a memory device. At block 1204, the controller does not encode duplicate information in the command. At block 1206, the controller encodes the command. At block 1208, the controller sends the compressed command to the memory device. At block 1210, the command is received at the memory device. At block 1212, the compressed command is decompressed or being used as it with the information that is being carried in the command. At block 1214, the command is executed.

Decompression of the command to reflect the old legacy format to the rest of the NAND's circuitry is optional. Some embodiments may use the compressed data as is by the NAND without decompressing all of it, or part of it and restoring the original format to be reflected to the rest of the NAND. This implementation decision is open to the consideration of the architecture design. The benefit of the decompression is that a relatively small logic can reflect to the rest of the NAND the command as if it was sent using the legacy format—which may make the change in the NAND's design smaller and simpler.

In another embodiment, in most use cases the compression/modified format change will be pre-set at init, or on the fly during the operation of the device, as may be decided by the controller's side. The decision about which format changes will be active will be informed to the NAND. In most cases this will happen once as init stage after reset, and be used all the time—unless specific reason for not using, or start using some improvement is reached. Specific on the flight commands changes may be activated/disabled when identifying some pattern of commands what may require to change currently selected command format to support such traffic.

Figure 13:
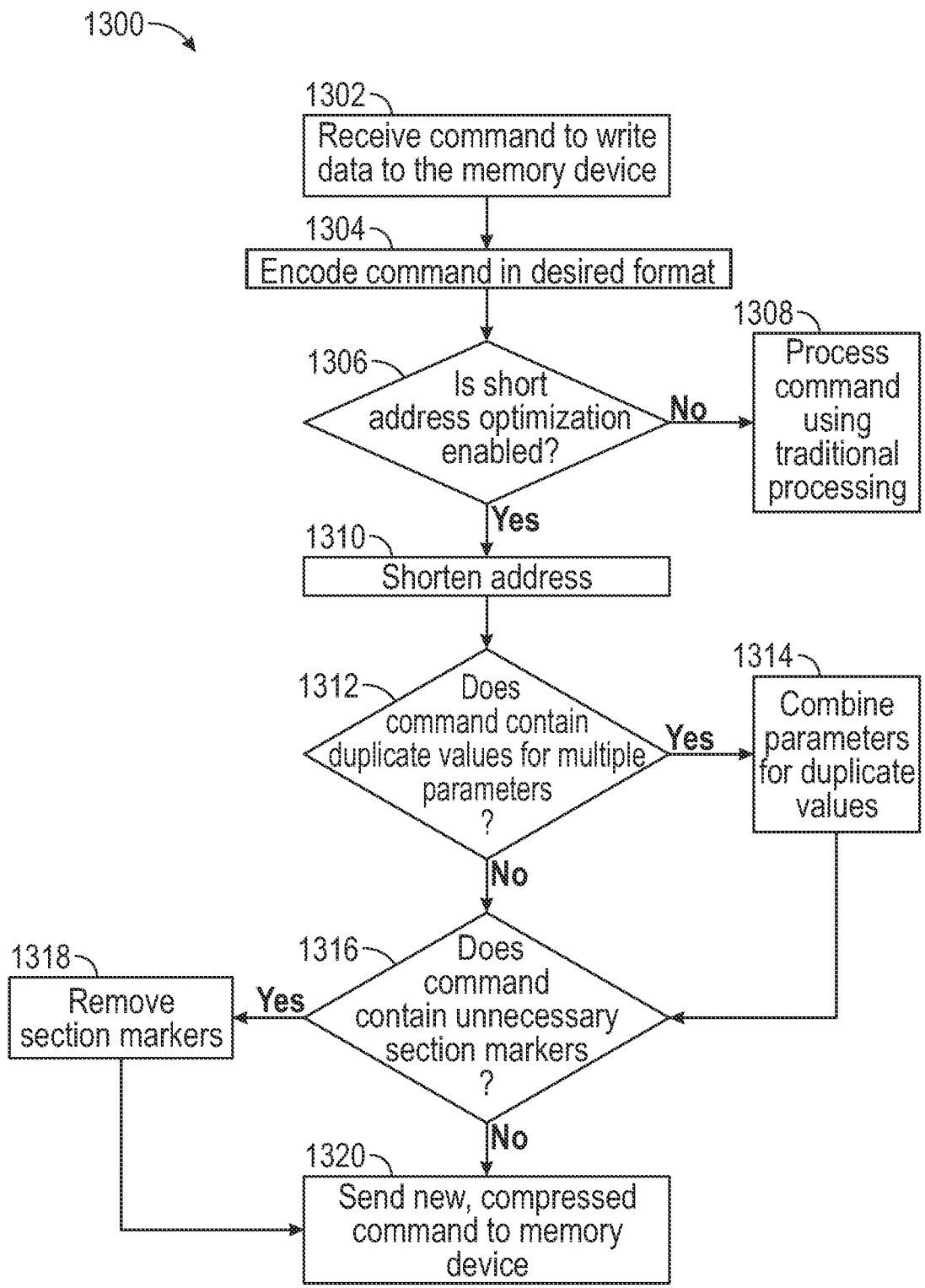
FIG. 13 is a flowchart illustrating a method for command compression, according to one embodiment.

FIG. 13 is a flowchart illustrating a method 1300 for command compression, according to one embodiment. The method begins at block 1302. At block 1302, the controller, such as controller 108 of FIG. 1, receives a command to write data to the memory device. At block 1304, the controller encodes the command. At block 1306, the controller determines whether the command contains a long address. If the controller determines that the command does not contain a long address, then the method 1300 proceeds to block 1308. At block 1308, the controller processes the command using traditional processing. If the controller determines that the command does contain a long address, then the method 1300 proceeds to block 1310. At block 1310, the controller shortens the long address.

In one embodiment, the encoding is done directly to the desired format on the ASIC/controller side. If the short address optimization was enabled, then the encoding will build the address in the short format, and if it is not enabled, then the address will be encoded using the long, legacy format. As for section markers, the markers will either be encoded or not.

At block 1312, the controller determines whether the command contains duplicate values for multiple parameters. If the controller determines that the command does contain duplicate values for multiple parameters, then the method 1300 proceeds to block 1314. At block 1314, the controller combines parameters for duplicate values. At the completion of block 1314, the method 1300 proceeds to block 1316. If the controller determines that the command does not contain duplicate values for multiple parameters, then the method 1300 proceeds to block 1316.

At block 1316, the controller determines whether the command contains unnecessary section markers. If the controller determines that the command does contain unnecessary section markers, then the method 1300 proceeds to block 1318. At block 1318, the controller removes the section markers, and then the method 1300 proceeds to block 1320. If the controller determines that the command does not contain any unnecessary section markers, then the method 1300 proceeds to block 1320. At block 1320, the controller sends a new compressed command to the memory device.

On the memory device side, the NAND will not check if the command's address is short. It checks if short address format is enabled, and then either reconstruct the long address from the short address that was received (decompress the specific bytes at the known offsets in the command), or uses the short address to set the offsets in latches to archive the correct offset inside the page. Other checks will also be done similarly. e.g. if the agreed setting decided by the controller and communicated to the NAND is to remove address or any other duplication was active/command's format was set not to repeat the address or any other relevant parameter transmission during some commands, then the address or that parameter that was sent only once according to the new format by the controller on the ASIC side will be used in all of its targets as if it was sent several times. And the same applies also for command's section markers.

Ultimately, a similar process is running both on the transmitting side (controller/ASIC), which encodes the transmitted data according to the selected command version or according to enabled/disabled status of each compression property/possibility. On the receiving side (NAND), the use of the command and the extraction of the command's relevant data from the relevant offsets in the command, will be performed according to the active command's format.

Figure 14:
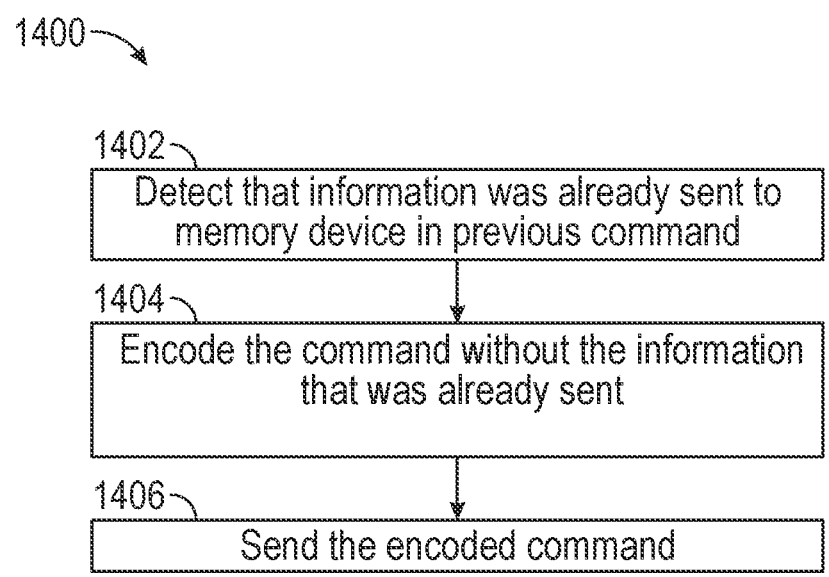
FIG. 14 is a flowchart illustrating a method for command detection/compression, according to one embodiment.

FIG. 14 is a flowchart illustrating a method for command compression, according to one embodiment. The method 1400 begins at block 1402. At block 1402, the controller, such as the controller 108 of FIG. 1, detects that information was sent to the memory device in a previous command. At block 1404, the controller encodes the command without the information that was already sent. At block 1406, the controller sends the encoded command to the memory device.

Figure 15:
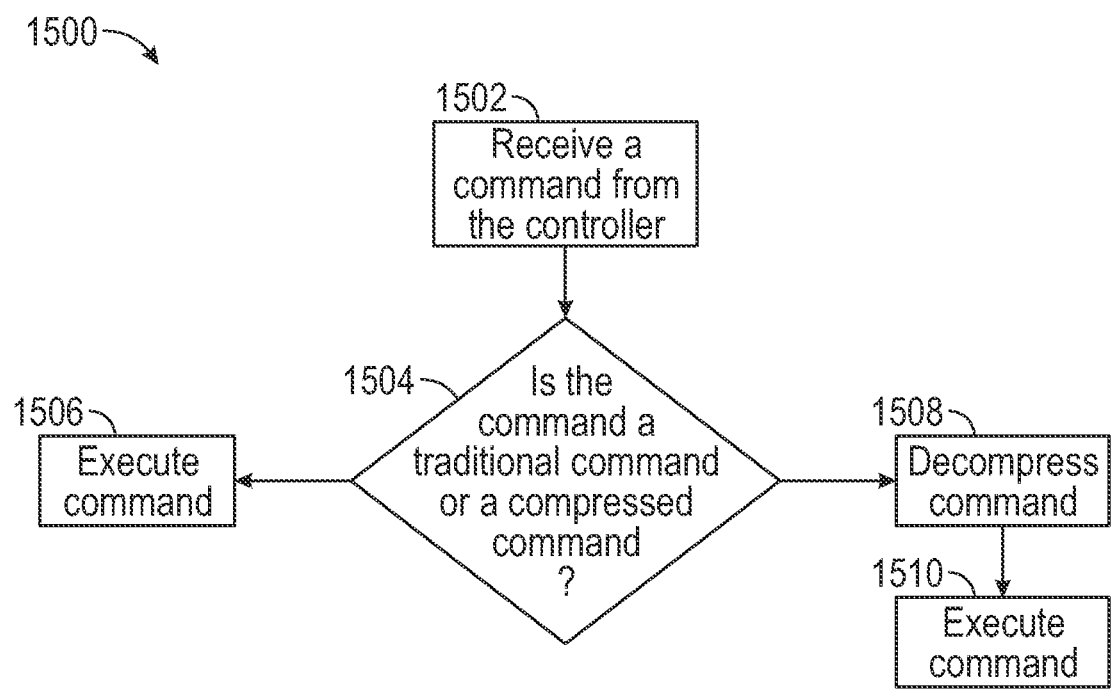
FIG. 15 is a flowchart illustrating a method for command decompression, according to one embodiment.

FIG. 15 is a flowchart illustrating a method for command decompression, according to one embodiment. The method begins at block 1502. At block 1502 the memory device receives a command from the controller, such as controller 108 of FIG. 1. At block 1504, the memory device determines whether the expected command is a traditional command or a compressed command/command being sent using alternate format, according to the default values and preceding command version change messages it may have received from the controller after reset, before getting the command. If the command is a traditional command, then the command is executed at block 1506. If the command is a compressed command or have alternate format, then the command is decompressed at block 1508 and then executed at block 1510. Note that the decompression/format change back to the original is optional. The important thing is that the memory device (e.g. NAND) will know how to interpret the command and use the data sent in it so that it will achieve the desired functionality that would be achieved even if the command would be sent using the legacy standard option.

Transmitting data over the ASIC-NAND is improved by encoding and decoding the data using synchronization of the selected formal interpretation between the ASIC and NAND. Having a synchronizing mechanism that will communicate the selected format between the ASIC and NANA, the ability to encode and decode the traffic running over the ASIC/NAND using different formats allows various improvements that can be achieved using the instant disclosure, including, but not limited to, command compression and introduction of new capabilities that are not available in the standard command format while keeping the option to support the legacy/default command format. By sending shorter commands over the ASIC/NAND bus, the number of times that the ASIC/NAND bus will have to change the communication speed from conventional mode to TM will be decreased. The desired NAND functionality needed for common use cases allows faster commands transmission leading to faster end to end commands execution and improving the operation speed of the device, the consumed power of the device, and in some cases of unstable power voltage, also its reliability—since it can allow the device to finish doing urgent operations faster before power will drop, when power becomes unstable or during ungraceful shutdown (UGSD).

It is to be understood that "detect" or "detecting" includes the ability to get a specific HW/signaling/message/command that informs which type of changes/compressions are active at the current moment for each command, if any, and if not then use the original standard communication.

It is to be understood that enabling and disabling of every command improvement separately is contemplated as an all or nothing method is not required. Rather, the enabling is according to the improvement, e.g. address shortening enable or not. If enabled, the command marked if the command is about to perform a full page programming or partial page programming (as this can affect the address size). Such setting can be changed on-the-fly for different scenarios of using the device. When not performing AIPR, address repeating per plane can be eliminated. The disclosure also contemplates a configuration method e.g. a register to know the offsets that will be used for page read/write when doing partial page operations (units of FMU+the size of the ECC/data validation signature of that FMU) when doing the address compression. Unnecessary command separation fields (and include which separation fields are removed and which one are not) can be removed. The removal of field's separation will eliminate the need to change from TM to legacy data rate and then back to TM again. This can be done when the length of the data is known in advance. It should also be noted that command decompression is not mandatory.

In one embodiment, a data storage device comprises: a memory device; and a controller coupled to the memory device, wherein the controller is configured to: detect that a command received from the controller is a compressed command; decompress the compressed command; and execute the decompressed command. The decompressing comprises expanding the decompressed command into an original command size. The decompressed command indicates that data is to be written to multiple planes of the memory device. The compressed command includes a single copy of the data to be written. The decompressed command indicates that the data is to be written to multiple pages. The executing comprises writing data across multiple planes and pages of a triple level cell (TLC) memory portion of the memory device. The memory device is configured to detect whether a command received from the controller is a traditional command or a compressed command. The controller is configured to create the compressed command and wherein the compressed command utilizes less bytes than a same command prior to compressing. The decompressed command indicates that information for execution of the decompressed command has previously been sent to the memory device. The memory device is configured to switch between a first data rate and a second data rate that is different than the first data rate, wherein the switching occurs when receiving a command. The switching occurs less when receiving a compressed command in comparison to receiving a same command that has not been compressed.

In another embodiment, a data storage device comprises: a memory device; and a controller coupled to the memory device, wherein the controller is configured to: detect that a command received from the controller is a compressed command; retrieve information for the compressed command from a location in the memory device; and execute the compressed command based upon the retrieved information. The retrieved information is data sent in a previous command. The retrieved information is instructions on an operation to perform upon receipt of the compressed command. The compressed command includes an indication that the command is a compressed command, and wherein the detecting comprises detecting the indication. The memory device is configured to switch between processing compressed commands and commands that have not been compressed. The memory device is configured to perform a sense operation prior to the detecting.

In another embodiment, a data storage device comprises: means to store data, wherein the means to store data is configured to: detect whether a received command is a compressed command or a non-compressed command; and execute the detected command; and a controller coupled to the means to store data, wherein the controller is configured to: send compressed commands and non-compressed commands to the means to store data. The controller comprises a command pattern detector and a compressed command generator. The means to store data comprises a mode detection mechanism and a command interpreter.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
   a memory device; and a controller coupled to the memory device, wherein the memory device is configured to:
  detect that commands received from the controller are either in a compressed or an uncompressed format;
  receive an uncompressed command from the controller, wherein the uncompressed format comprises an opcode and address information;
  receive a compressed command after the command from the controller, wherein the compressed format comprises an opcode and address information;
  decompress the compressed command, wherein the decompressing comprises translating the address information of the compressed command back to the address information of the command; and
  execute the decompressed command.

2. The data storage device of claim 1, wherein the decompressing comprises expanding the decompressed command into an original command size.

3. The data storage device of claim 1, wherein the decompressed command indicates that data may be written to or read from multiple planes and multiple pages of the memory device.

4. The data storage device of claim 3, wherein the compressed command includes a single copy of an address to be written to, with a possibility to add indication about a data length that follows.

5. The data storage device of claim 4, wherein the decompressed command indicates that the data is to be written to multiple pages.

6. The data storage device of claim 1, wherein the executing comprises writing data across multiple planes and pages of a triple level cell (TLC) memory portion of the memory device.

7. The data storage device of claim 1, wherein the controller is configured to create the compressed format and wherein the compressed format utilizes less bytes than a same command prior to compressing.

8. The data storage device of claim 1, wherein the decompressed command indicates that information for execution of the decompressed command has previously been sent to the memory device.

9. The data storage device of claim 1, wherein the memory device is configured to switch between a first data rate and a second data rate that is different than the first data rate, wherein the switching occurs when receiving a command.

10. The data storage device of claim 9, wherein the data rate switching occurs less times when receiving a compressed command in comparison to receiving a same command that has not been compressed.

11. The data storage device of claim 1, wherein the memory device is configured to detect a signal that the command is to be executed in a different mode than a default mode.

12. The data storage device of claim 1, wherein the memory device is configured to detect a signal that another and/or different operation is to be executed after the received command.

13. The data storage device of claim 1, wherein the memory device is configured to support default versions of commands and different formats of commands.

14. The data storage device of claim 1, wherein the memory device is configured to receive a signal format change from the controller.

15. The data storage device of claim 14, wherein the signal format change is performed using a command or hardware signaling.

16. The data storage device of claim 1, wherein the memory device is configured to:
  select a command format; or
  enable/disable specific improvements; or
  change format on the fly.

17. A data storage device, comprising:
a memory device; and
a controller coupled to the memory device,
wherein the memory device is configured to:
  detect that commands received from the controller are either in a compressed format or an uncompressed format;
  receive an uncompressed command from the controller, wherein the uncompressed format comprises an opcode and address information;
  receive a compressed command after the command from the controller, wherein the compressed format comprises an opcode and address information;
  decompress the compressed command, wherein the decompressing comprises one or more of:
    reformatting a portion of the address information of the compressed command back to a corresponding portion of the address information of the command; and
    retrieving address information for the compressed command from a location in the memory device; and
  executing the decompressed command.

18. The data storage device of claim 17, wherein the retrieved information is data sent in a previous command.

19. The data storage device of claim 17, wherein the retrieved information is used for performing an operation upon receipt of the compressed command.

20. The data storage device of claim 17, wherein the compressed command includes an indication that the command is a compressed command, and wherein the detecting comprises detecting the indication.

21. The data storage device of claim 17, wherein the memory device is configured to switch between processing compressed commands and commands that have not been compressed.

22. The data storage device of claim 17, wherein the memory device is configured to perform a sense operation prior to the detecting.

23. A data storage device, comprising:
means to store data, wherein the means to store data is configured to:
  detect whether a received command is in a compressed format or a non-compressed format; and
  execute the detected command; and
a controller coupled to the means to store data, wherein the controller is configured to:
  send commands to the means to store data in the compressed format or the non-compressed format;
  detect that address information of a compressed command has already been sent to the means to store data with an non-compressed command; and
  remove during a compressing of the compressed command the address information detected to have already been sent with the non-compressed command.

24. The data storage device of claim 23, wherein the controller comprises a command pattern detector and a command generator.

25. The data storage device of claim 23, wherein the means to store data comprises a mode detection mechanism and a command interpreter.

26. The data storage device of claim 23, wherein the controller is further configured to compress a command, the compressing comprises:
- determining whether the command contains one or more duplicate values for one or more parameters;
- combining the one or more duplicate values for the one or more parameters;
- determining whether the command contains unnecessary section markers; and
- removing the unnecessary section markers.

* * * * *